(12) United States Patent
Take

(10) Patent No.: US 7,903,344 B2
(45) Date of Patent: Mar. 8, 2011

(54) ZOOM LENS, OPTICAL APPARATUS EQUIPPED WITH THE ZOOM LENS AND METHOD FOR FORMING AN IMAGE OF AN OBJECT AND VARYING A FOCAL LENGTH

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/235,719

(22) Filed: Sep. 23, 2008

(65) Prior Publication Data
US 2009/0086333 A1    Apr. 2, 2009

(30) Foreign Application Priority Data

Oct. 1, 2007    (JP) ................ P2007-257607

(51) Int. Cl.
*G02B 15/14*    (2006.01)
(52) U.S. Cl. ....................................... 359/676
(58) Field of Classification Search ........... 359/676–706
See application file for complete search history.

(56) References Cited

U.S. PATENT DOCUMENTS

| 4,230,398 A * | 10/1980 | Tsuji et al. ............ 359/683 |
| 4,466,708 A * | 8/1984 | Betensky ............ 359/690 |
| 5,056,900 A * | 10/1991 | Mukaiya et al. ...... 359/676 |
| 5,694,252 A | 12/1997 | Yahagi |
| 7,064,903 B2 * | 6/2006 | Yakita ............ 359/690 |
| 2007/0223108 A1 | 9/2007 | Iijima |

FOREIGN PATENT DOCUMENTS

| EP | 1780579 A1 | 5/2007 |
| JP | 8-146295 A | 6/1996 |
| JP | 9-159917 A | 6/1997 |
| JP | 2002-365539 A | 12/2002 |
| JP | 2002-365548 A | 12/2002 |
| JP | 2006-023593 A | 1/2006 |
| JP | 2007-178769 A | 7/2007 |

* cited by examiner

*Primary Examiner* — Darryl J Collins
(74) *Attorney, Agent, or Firm* — Miles & Stockbridge P.C.

(57) ABSTRACT

A zoom lens comprises a plurality of lens groups arranged along an optical axis in order from an object side, wherein a lens group closest to an image among the plurality of lens groups has a front lens group, and a rear lens group arranged with an air space on an image side of the front lens group, and wherein the lens group closest to the image is stationary with respect to an image plane, upon zooming from a wide-angle end state to a telephoto end state.

15 Claims, 26 Drawing Sheets

Fig.3
(a)
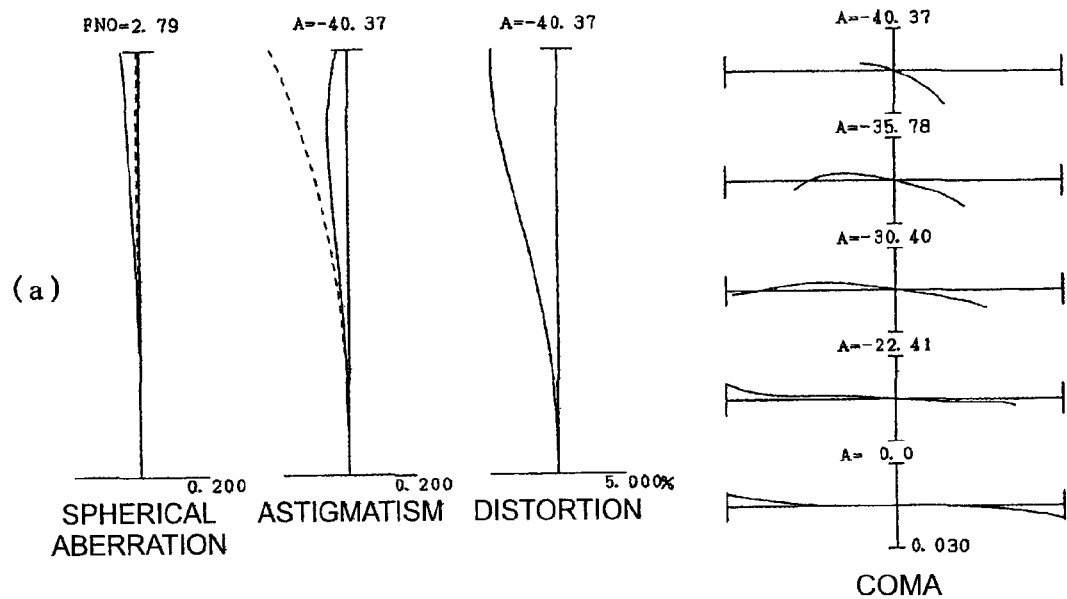
(b)
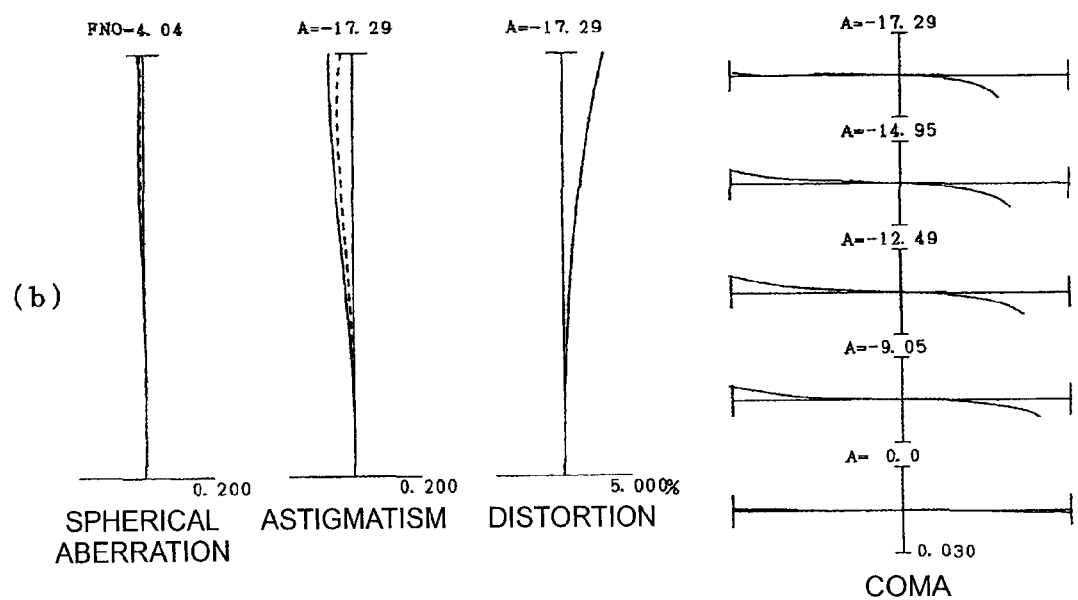

Fig.7
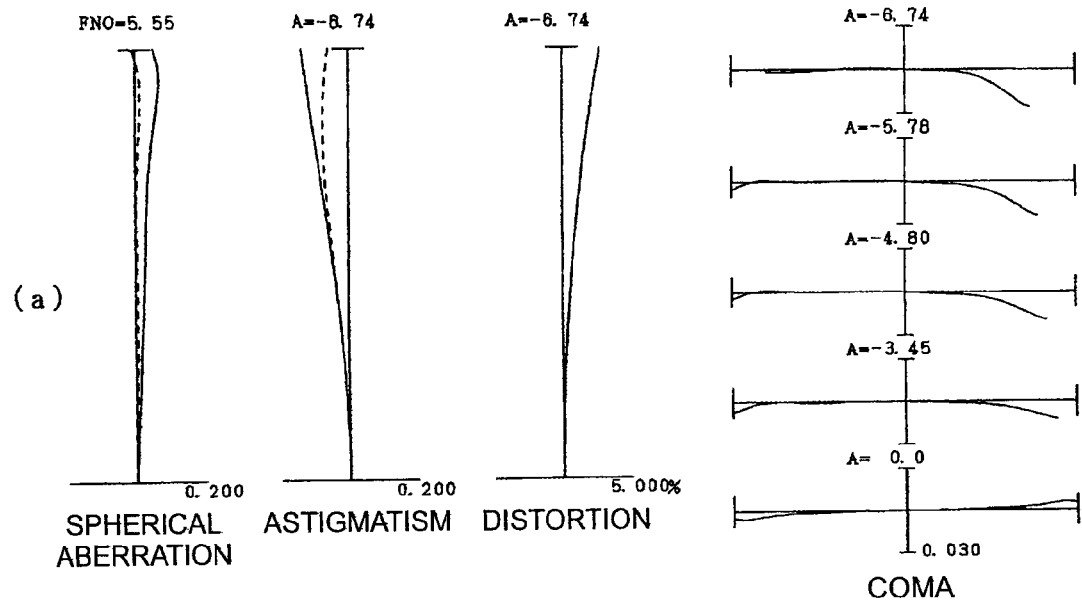
(a)
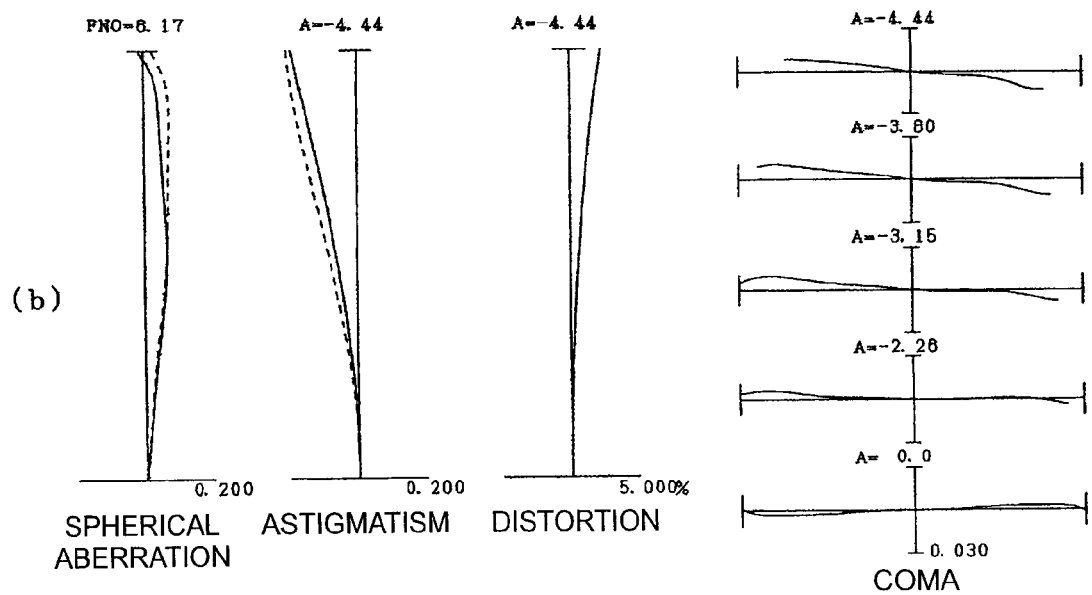
(b)

Fig12
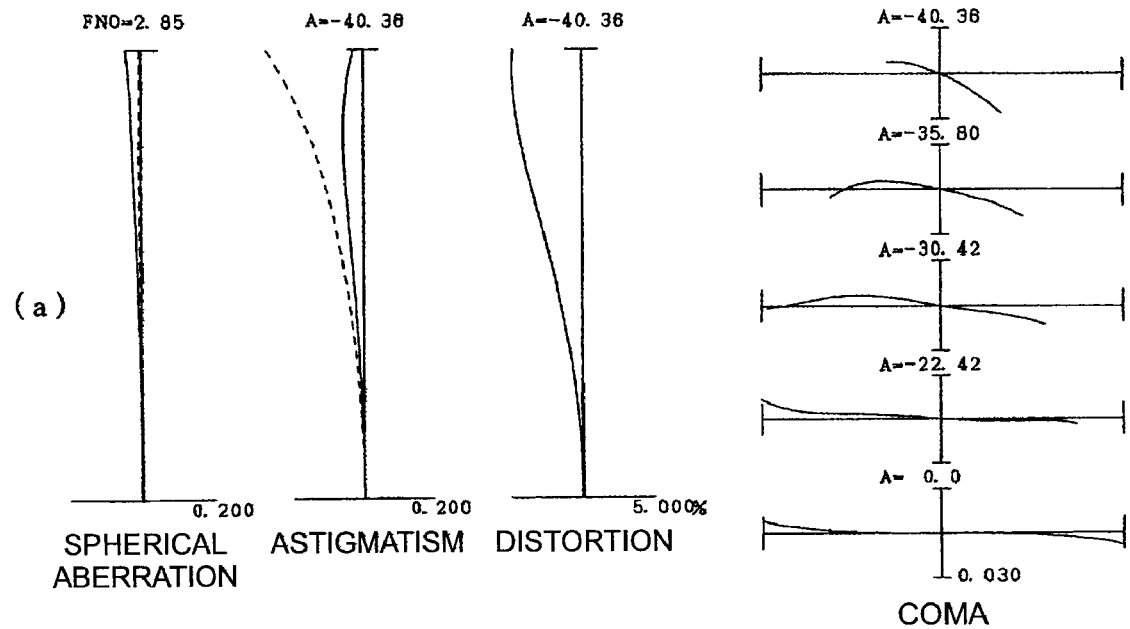
(a)
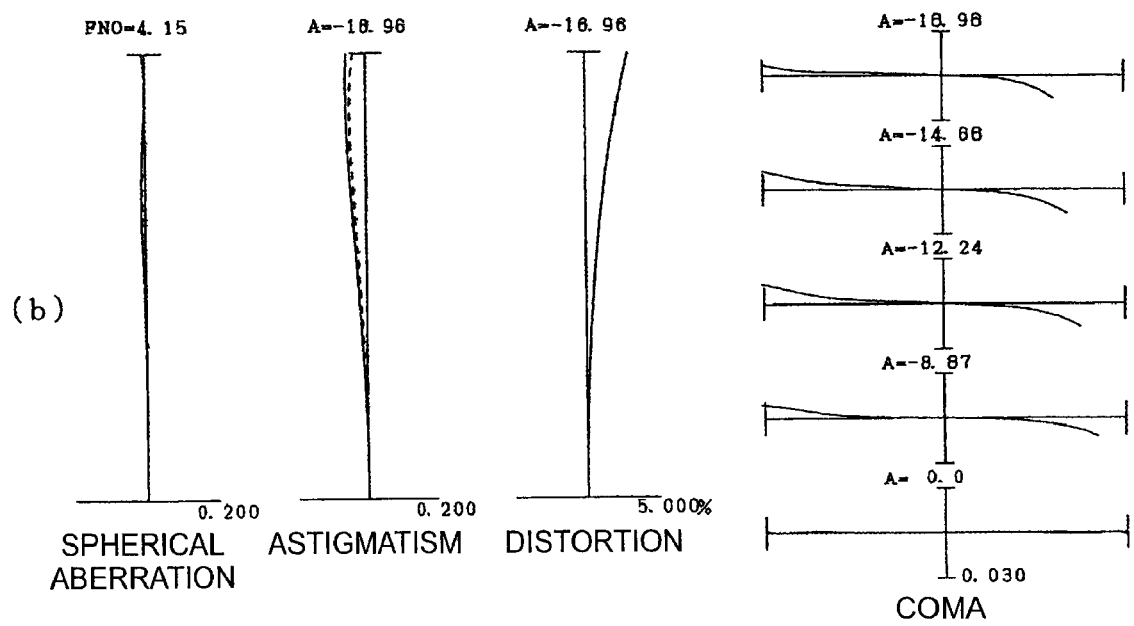
(b)

Fig.13
(a)
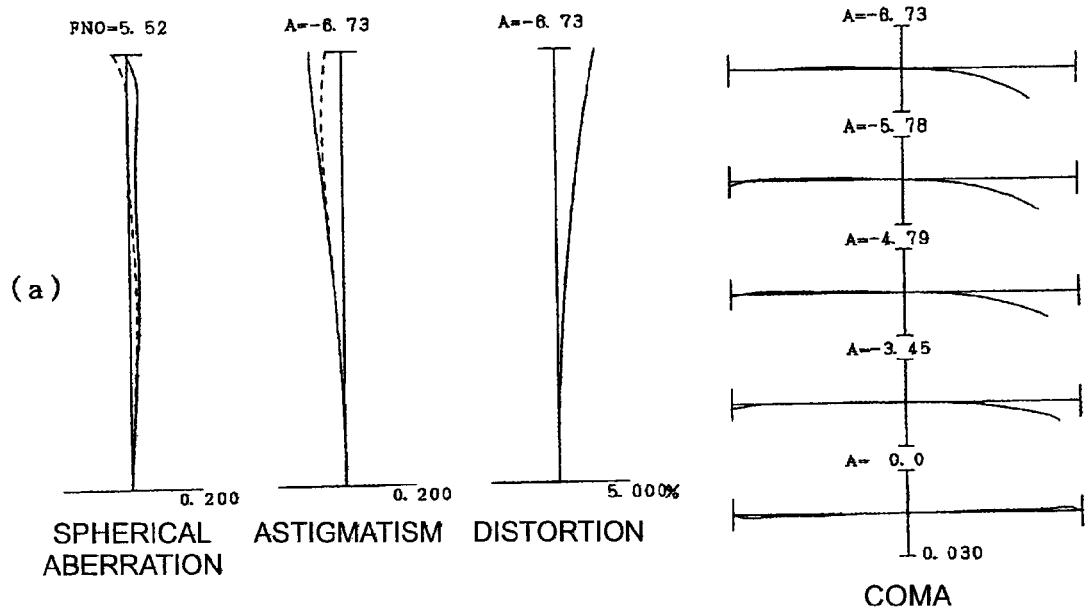
(b)
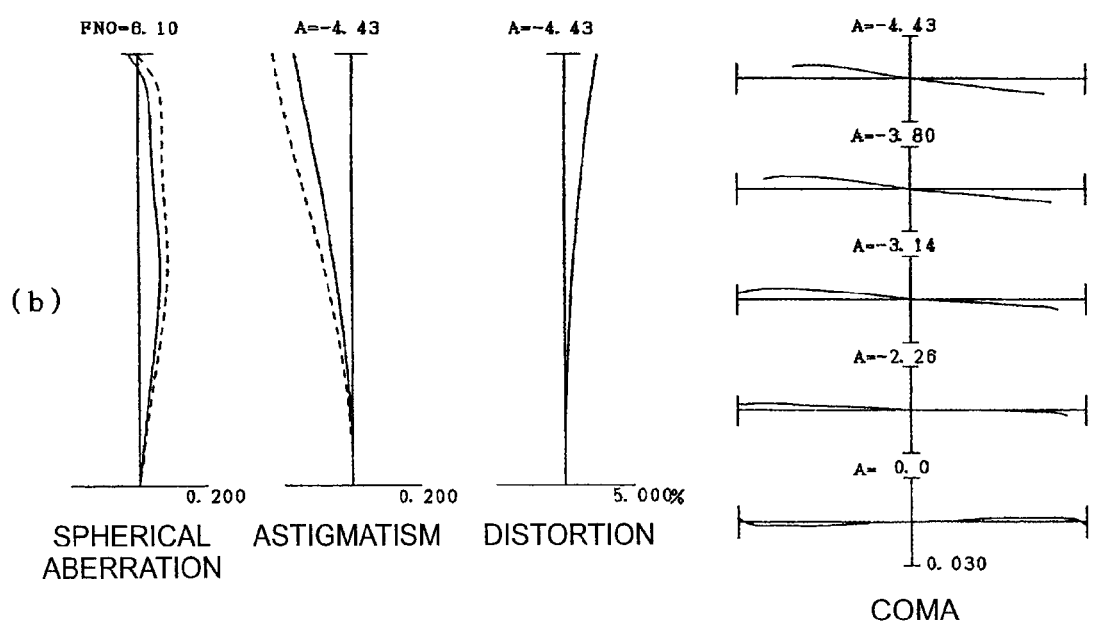

Fig.19
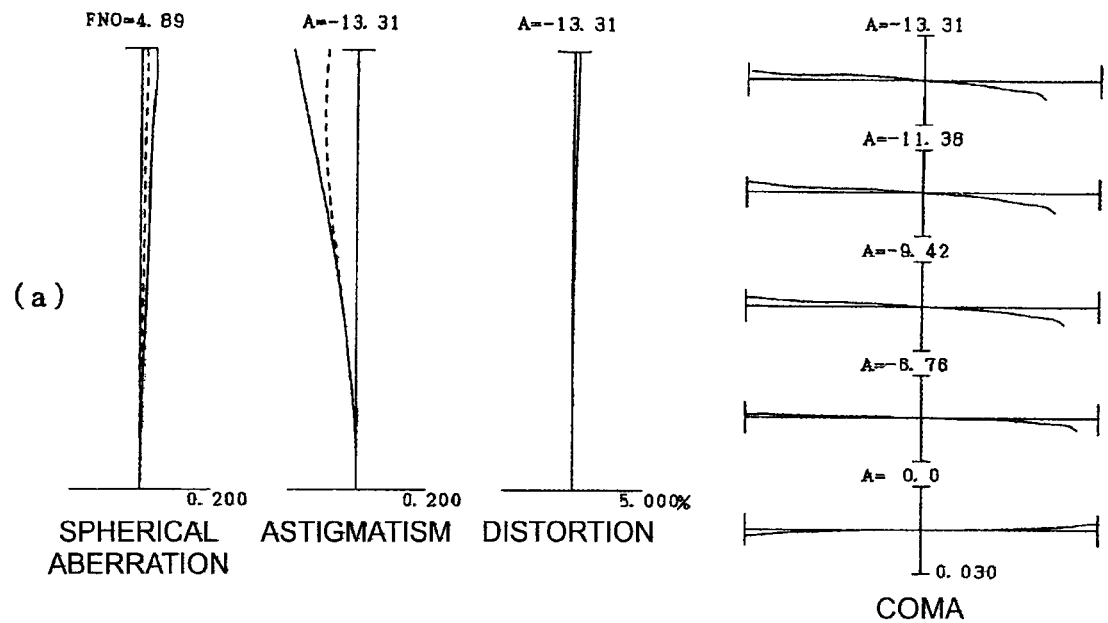
(a)
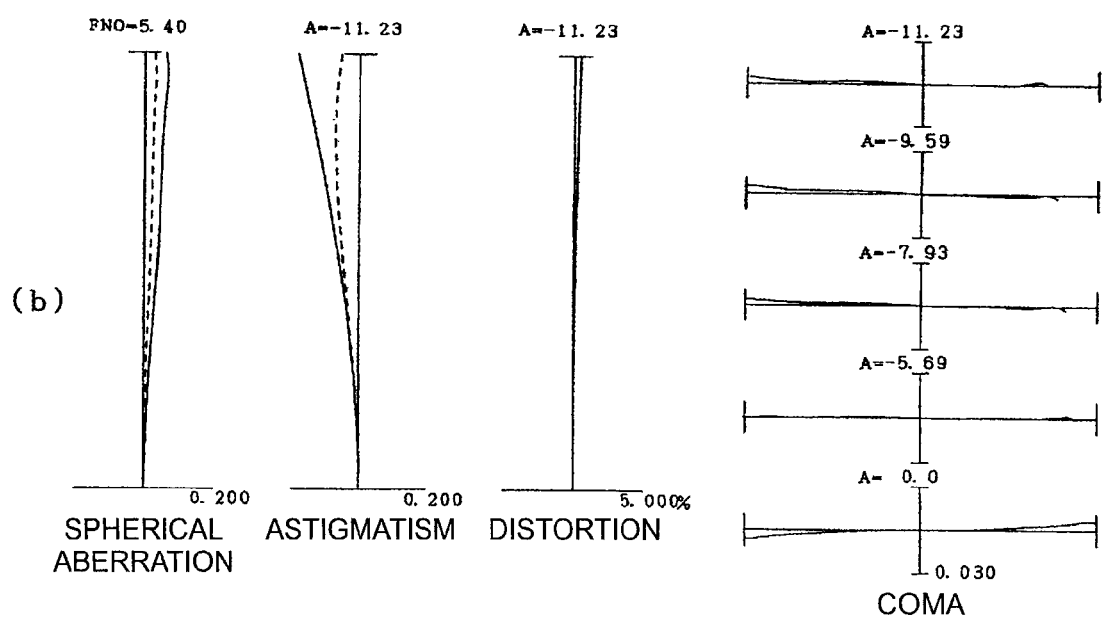
(b)

*Fig.22*
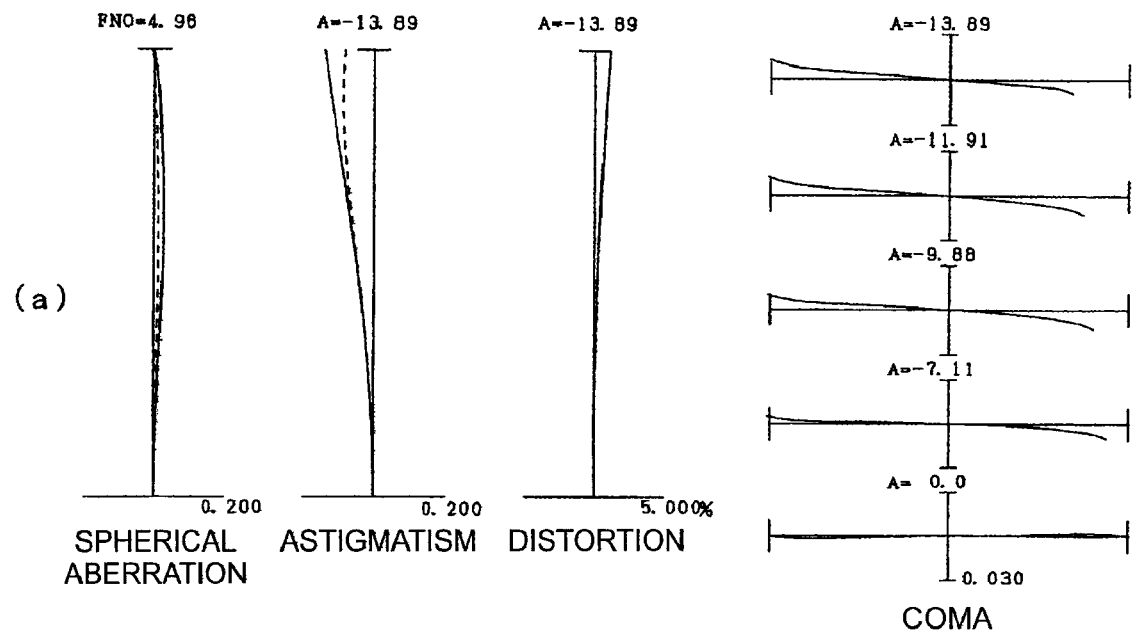
(a)
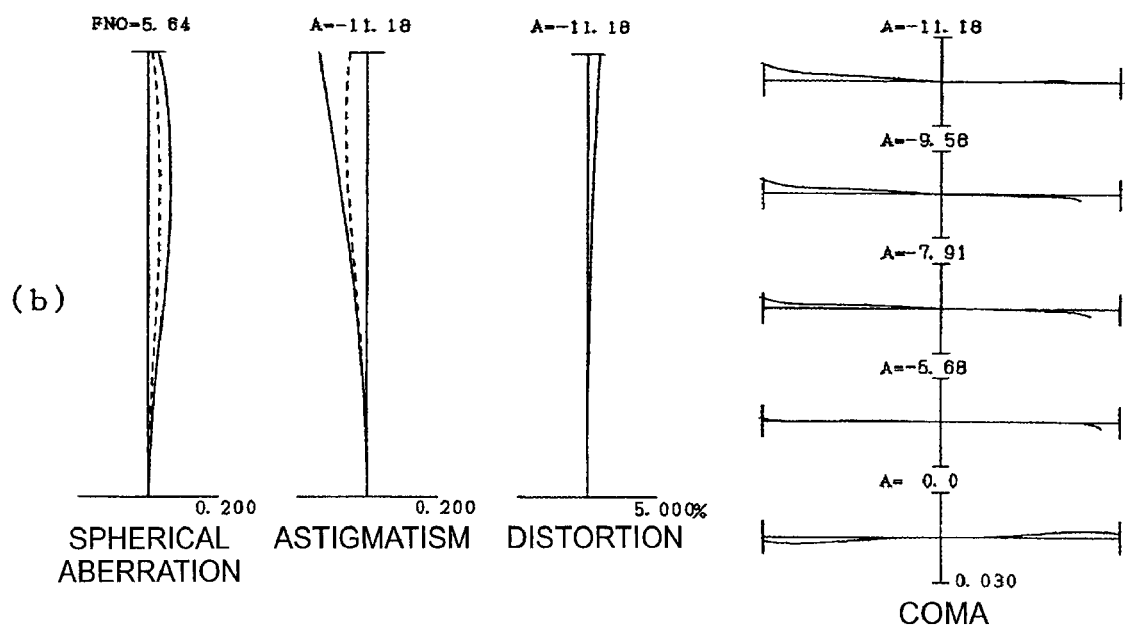
(b)

ZOOM LENS, OPTICAL APPARATUS EQUIPPED WITH THE ZOOM LENS AND METHOD FOR FORMING AN IMAGE OF AN OBJECT AND VARYING A FOCAL LENGTH

BACKGROUND OF THE INVENTION

1. Field of the Invention

The present invention relates to a zoom lens.

2. Related Background Art

There is, for example, a conventionally known zoom lens of a positive, negative, positive, positive, and positive 5-group type. This zoom lens of the positive, negative, positive, positive, and positive 5-group type is composed of the following five lens groups arranged in the order from the object side: a first lens group having a positive refracting power; a second lens group having a negative refracting power; a third lens group having a positive refracting power; a fourth lens group having a positive refracting power; and a fifth lens group having a positive refracting power, and is configured so that, upon zooming from a wide-angle end state (a state in which the focal length is the shortest) to a telephoto end state (a state in which the focal length is the longest), a space between the first lens group and the second lens group increases, a space between the second lens group and the third lens group decreases, and the fifth lens group moves to the object side (e.g., cf. Japanese Patent Application Laid-open No. 2002-365548).

SUMMARY OF THE INVENTION

However, when the lens group closest to the image is made movable to effect focus adjustment as in the zoom lens described in the foregoing Application Laid-open No. 2002-365548, there is a possibility that the movable lens group is pushed by a user or the like to move because the movable lens group is located at the closest position to the image, i.e., the position where it can be touched by the user or the like. As a consequence, the optical performance of the zoom lens could vary on every occasion of use.

An object of an embodiment of the present invention is to provide a zoom lens capable of preventing the optical performance of the zoom lens from varying on every occasion of use, and an optical apparatus equipped with this zoom lens.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

A zoom lens according to an embodiment of the present invention is a zoom lens comprising a plurality of lens groups arranged along an optical axis in order from an object side, wherein a lens group closest to an image among the plurality of lens groups has a front lens group, and a rear lens group arranged with an air space on an image side of the front lens group, and wherein the lens group closest to the image is stationary with respect to an image plane, upon zooming from a wide-angle end state to a telephoto end state.

The zoom lens according to another embodiment of the present invention is preferably configured so that the front lens group is moved in a direction of the optical axis to adjust focus.

In the zoom lens according to another embodiment of the present invention, preferably, the rear lens group has a negative refracting power.

In the zoom lens according to another embodiment of the present invention, preferably, the front lens group in the lens group closest to the image has a positive lens with a convex surface on the object side and the rear lens group in the lens group closest to the image is a negative lens with a concave surface on the object side.

The zoom lens according to another embodiment of the present invention preferably satisfies the condition of the following relation:

$$1.25 < fx/fw < 23.2,$$

where fw is a focal length of the entire lens system in the wide-angle end state and fx is a focal length of the lens group closest to the image.

Furthermore, the zoom lens according to another embodiment of the present invention preferably satisfies the condition of the following relation:

$$0.05 < |fxF|/fx < 1.25,$$

where fx is a focal length of the lens group closest to the image and fxF is a focal length of the front lens group.

An optical apparatus according to another embodiment of the present invention (e.g., electronic still camera 1 in an embodiment) comprises any one of the above-described zoom lenses, which forms an image of an object on a predetermined image plane.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an aberration diagram showing aberrations in an infinity in-focus state in the first embodiment, wherein (a) is an aberration diagram of aberrations in the wide-angle end state and (b) is an aberration diagram of aberrations in an intermediate focal length state 1.

FIG. 7 is an aberration diagram showing aberrations in the infinity in-focus state in the second embodiment, wherein (a) is an aberration diagram of aberrations in an intermediate focal length state 2 and (b) is an aberration diagram of aberrations in the telephoto end state.

FIG. 12 is an aberration diagram showing aberrations in the infinity in-focus state in the fourth embodiment, wherein (a) is an aberration diagram of aberrations in the wide-angle end state and (b) is an aberration diagram of aberrations in an intermediate focal length state 1.

FIG. 13 is an aberration diagram showing aberrations in the infinity in-focus state in the fourth embodiment, wherein (a) is an aberration diagram of aberrations in an intermediate focal length state 2 and (b) is an aberration diagram of aberrations in the telephoto end state.

FIG. 19 is an aberration diagram showing aberrations in the infinity in-focus state in the sixth embodiment, wherein (a) is an aberration diagram of aberrations in an intermediate focal length state 2 and (b) is an aberration diagram of aberrations in the telephoto end state.

FIG. 22 is an aberration diagram showing aberrations in the infinity in-focus state in the seventh embodiment, wherein (a) is an aberration diagram of aberrations in an intermediate focal length state 2 and (b) is an aberration diagram of aberrations in the telephoto end state.

DESCRIPTION OF THE PREFERRED EMBODIMENTS

Figure 1:
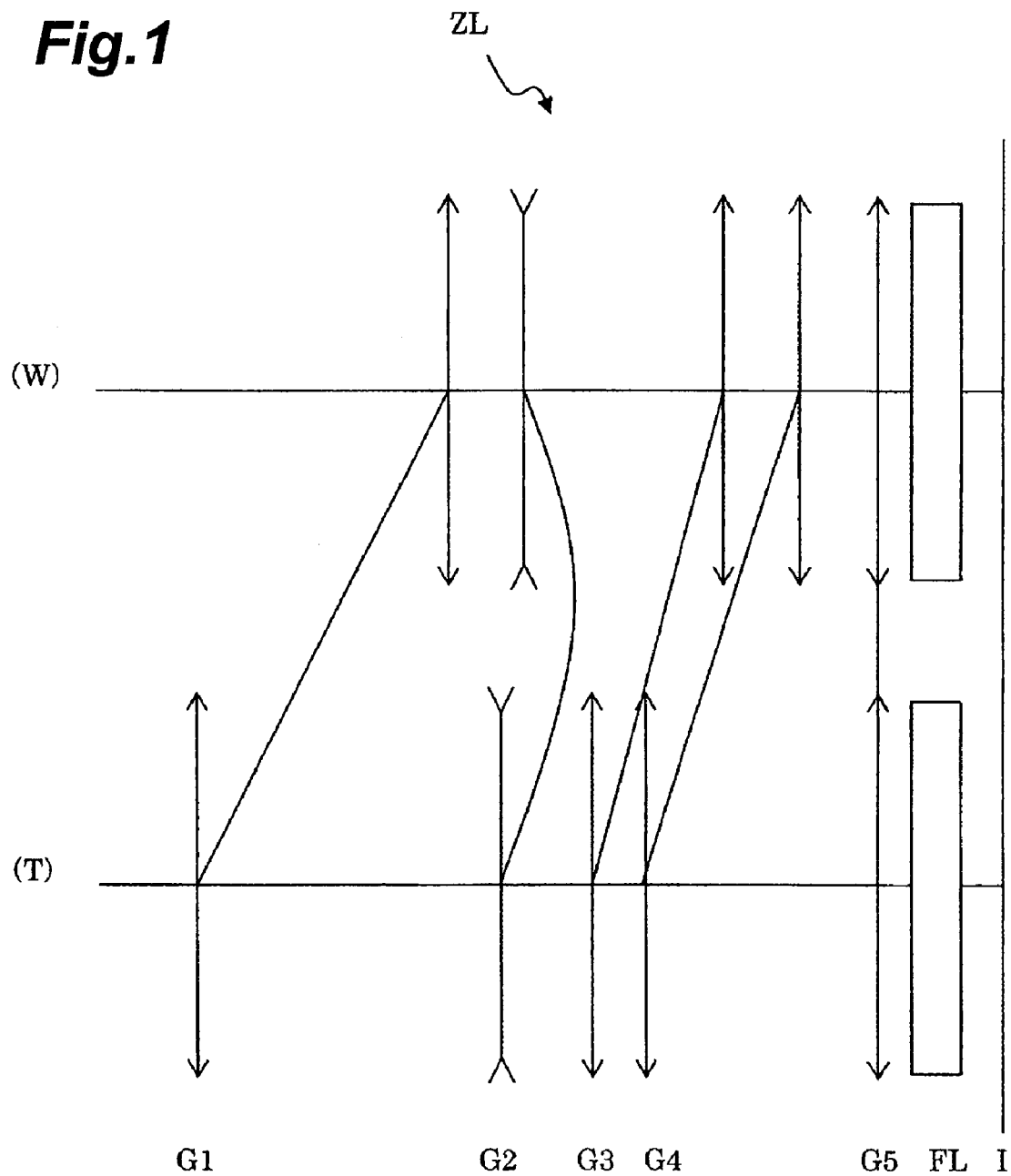
FIG. 1 is a refracting power layout of a zoom lens according to an embodiment of the present invention.

The preferred embodiments of the present invention will be described below with reference to the drawings. First, a configuration of a zoom lens ZL according to an embodiment of the present invention will be described using FIG. 2. This zoom lens ZL has the following lens groups in the order from the object side: a first lens group G1 having a positive refracting power; a second lens group G2 having a negative refracting power; a third lens group G3 having a positive refracting power; a fourth lens group G4 having a positive refracting power; and a fifth lens group G5 having a positive refracting power; and is configured so that, with a change in the focal length from a wide-angle end state (a state in which the focal length is the shortest) to a telephoto end state (a state in which the focal length is the longest), at least the first lens group G1 and the fourth lens group G4 move to the object side so as to increase a space between the first lens group G1 and the second lens group G2, decrease a space between the second lens group G2 and the third lens group G3, decrease a space between the third lens group G3 and the fourth lens group G4, and increase a space between the fourth lens group G4 and the fifth lens group G5. In the zoom lens ZL of this configuration, the fifth lens group G5 has a front lens group G5F and a rear lens group G5B and the rear lens group G5B is arranged with an air space on the image side of the front lens group G5F. This zoom lens ZL is able to achieve excellent imaging performance with the angle of view at the wide-angle end of over 75° and with the zoom ratio of about 7×-10× or more.

The functions of the respective lens groups G1-G5 will be described below. The first lens group G1 has an action to converge a light beam and is arranged to be as close to the image plane in the wide-angle end state as possible so that off-axis rays can pass away from the optical axis, whereby the lens diameter of this first lens group G1 is made smaller. The first lens group G1 is moved to the object side so as to increase the space to the second lens group G2 in the telephoto end state, which enhances the converging action and decreases the total length of the lens system.

The second lens group G2 has an action to enlarge an image of an object formed by the first lens group G1, and the space between the first lens group G1 and this second lens group G2 is increased with change from the wide-angle end state to the telephoto end state, to increase an enlargement rate and vary the focal length.

The third lens group G3 has an action to converge the beam enlarged by the second lens group G2, and this third lens group G3 is desirably composed of a plurality of lens groups in order to achieve higher performance.

The fourth lens group G4 has an action to further converge the beam converged by the third lens group G3, and the space between the third lens group G3 and the fourth lens group G4 is positively changed with change in the focal length, which can suppress fluctuations of the image plane against change in the focal length.

The fifth lens group G5 is a lens group closest to the image in the present embodiment, it is composed of the front lens group G5F and the rear lens group G5B, and the rear lens group G5B is arranged with the air space on the image side of the front lens group G5F. The rear lens group G5B is stationary with respect to the image plane during carrying out zooming and the front lens group G5F is moved in the direction of the optical axis to effect focusing, thereby minimizing the moving distance due to focusing. In the description hereinbelow, the condition expressions and others will be described on the assumption that the lens group closest to the image is the fifth lens group G5. The rear lens group G5B has a negative refracting power. This configuration is preferable because the moving distance due to focusing can be made smaller.

In the zoom lens ZL of the present embodiment, preferably, the front lens group G5F forming the fifth lens group G5, which is the aforementioned lens group closest to the image, has a positive lens with a convex surface on the object side, and the rear lens group G5B is a negative lens with a concave surface on the object side. When this fifth lens group G5 is constructed in this configuration, it can be a structurally simple focus group and can be corrected well for spherical aberration and comatic aberration caused by the fifth lens group G5 alone.

The zoom lens ZL of the present embodiment desirably satisfies the following condition expression (1):

$$1.25 < fx/fw < 23.2 \qquad (1),$$

where fw is the focal length of the entire lens system in the wide-angle end state and fx is the focal length of the lens group closest to the image, i.e., the focal length of the fifth lens group G5.

The condition expression (1) is a condition expression for defining an appropriate range for the focal length fx of the lens group closest to the image (the focal length f5 of the fifth lens group G5 in the present embodiment). If the ratio is over the upper limit of this condition expression (1), the refracting power of the fifth lens group G5 will become too weak to correct well for comatic aberration caused by the fifth lens group G5 alone. On the other hand, if the ratio is below the lower limit of the condition expression (1), the refracting power of the fifth lens group G5 will become too strong and the fifth lens group G5 alone gives rise to large spherical aberration.

In order to ensure the effect of the present embodiment, the upper limit of the condition expression (1) is preferably set to 21.0. For further ensuring the effect of the present embodiment, the upper limit of the condition expression (1) is more preferably set to 19.5. Furthermore, in order to further ensure the effect of the present embodiment, the upper limit of the condition expression (1) is still more preferably set to 18.0. For ensuring the effect of the present embodiment, the lower limit of the condition expression (1) is preferably set to 2.0. For further ensuring the effect of the present embodiment, the lower limit of the condition expression (1) is more preferably set to 2.5. Furthermore, in order to further ensure the effect of the present embodiment, the lower limit of the condition expression (1) is still more preferably set to 3.0.

The zoom lens ZL of the present embodiment desirably satisfies the following condition expression (2):

$$0.05 < |fxF|/fx < 1.25 \qquad (2),$$

where fxF is the focal length of the front lens group forming the lens group closest to the image, i.e., the focal length of the front lens group G5F forming the fifth lens group G5.

The condition expression (2) is a condition expression for defining an appropriate range for the focal length ratio in the lens group closest to the image (the focal length ratio in the fifth lens group G5 in the present embodiment). If the ratio is over the upper limit of this condition expression (2), the refracting power of the front lens group G5F will become too weak to make sufficient correction for comatic aberration caused by the fifth lens group G5 alone. In addition, the moving distance will become too large during focusing. On the other hand, if the ratio is below the lower limit of the condition expression (2), the refracting power of the front lens group G5F will become too strong to correct well for spherical aberration and comatic aberration caused by the fifth lens group G5 alone. In addition, it is not preferable because aberration fluctuations due to focusing also become larger.

For ensuring the effect of the present embodiment, the upper limit of the condition expression (2) is preferably set to 1.1. For further ensuring the effect of the present embodiment, the upper limit of the condition expression (2) is more preferably set to 0.95. For ensuring the effect of the present embodiment, the lower limit of the condition expression (2) is preferably set to 0.20. For further ensuring the effect of the present embodiment, the lower limit of the condition expression (2) is more preferably set to 0.35.

In the conventional zoom lens, where it was attempted to adjust focus by the lens group closest to the image singly, the moving distance of the lens group became very large during the focus adjustment to a close object. Where it was attempted to adjust focus by the second lens group in the conventional zoom lens, a variation in the angle of view became large during the focus adjustment. In contrast to it, the zoom lens ZL of the present embodiment is able to achieve high imaging performance while having a high zoom ratio. With the zoom lens of the present embodiment and the optical apparatus equipped with the zoom lens, it becomes feasible to realize the zoom lens with excellent imaging performance of the high zoom ratio, as a zoom lens suitable for camcorders, digital still cameras, and so on using solid-state imaging sensors or the like.

Figure 25:
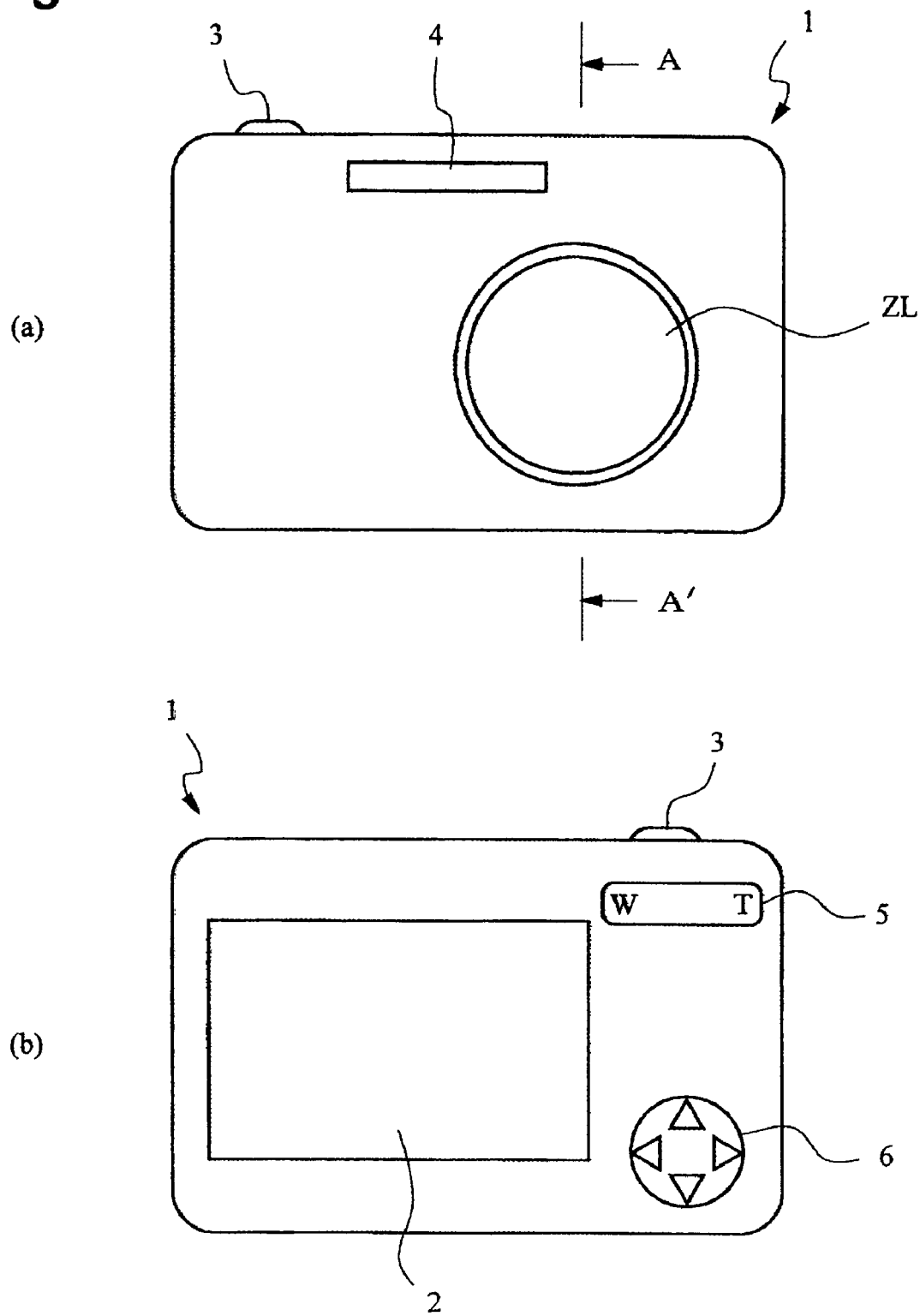
FIG. 25 shows an electronic still camera equipped with a zoom lens according to an embodiment of the present invention, wherein (a) is a front view thereof and (b) is a back view thereof.
Figure 26:
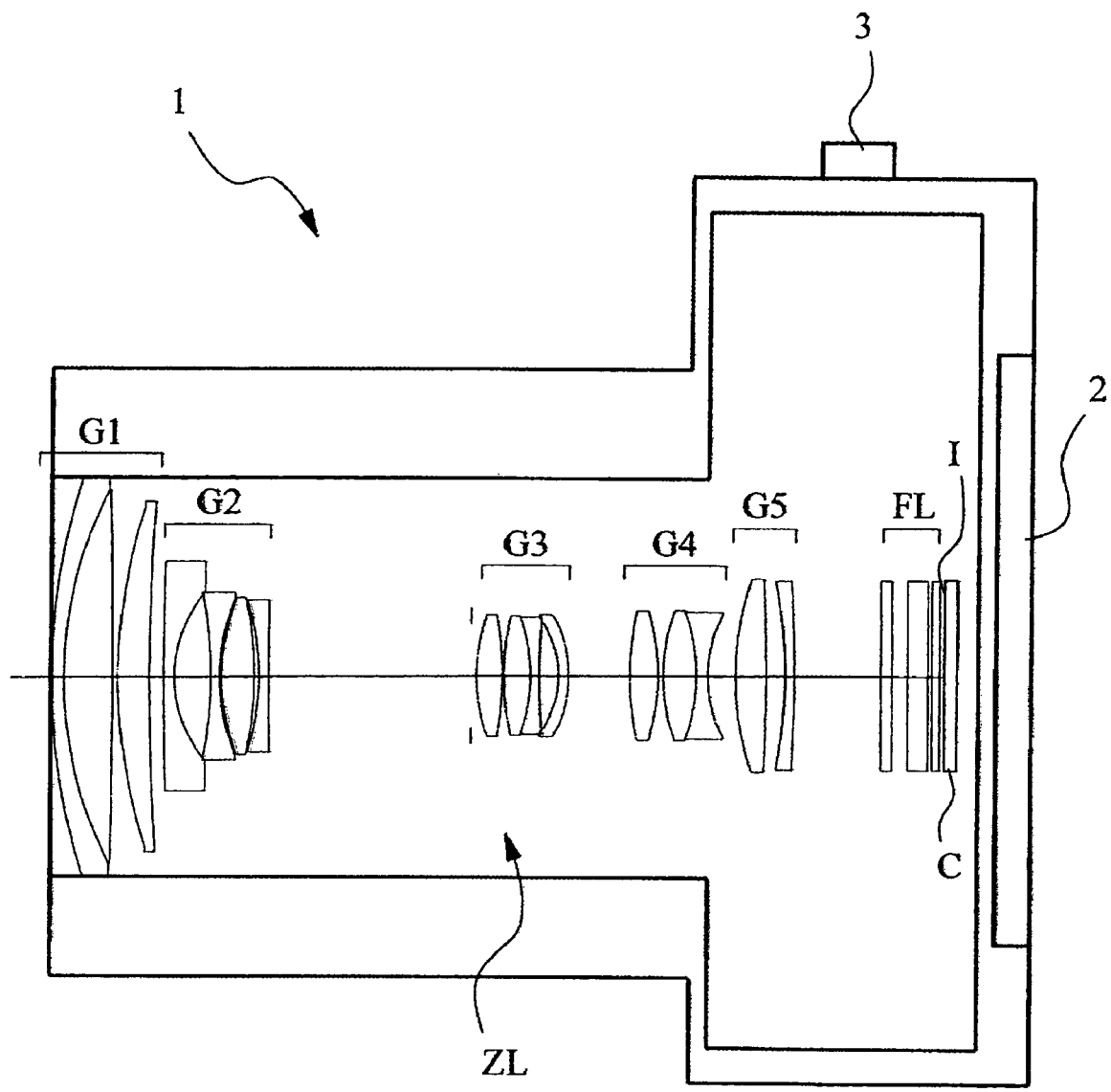
FIG. 26 is a sectional view along line A-A' in FIG. 25(*a*).

FIG. 25 and FIG. 26 show a configuration of an electronic still camera 1 (which will be hereinafter referred to simply as a camera) as an optical apparatus equipped with the above-described zoom lens ZL. This camera 1 is configured as follows: when an unrepresented power button is pushed, an unrepresented shutter of a taking lens (zoom lens ZL) is opened and the zoom lens ZL condenses light from an unrepresented object to form an image thereof on an imaging device C (e.g., a CCD, CMOS, or the like) arranged on an image plane I. The object image focused on the imaging device C is displayed on a liquid crystal monitor 2 arranged on the back side of the camera 1. A photographer determines a composition of the object image while watching the liquid crystal monitor 2, and depresses a release button 3 to take the object image through the imaging device C and store it in an unrepresented memory.

This camera 1 is provided with an auxiliary light emitter 4 for emitting auxiliary light for a dark object, a Wide (W)-Tele (T) button 5 for carrying out zooming the zoom lens ZL from the wide-angle end state (W) to the telephoto end state (T), a function button 6 used in setting various conditions of the camera 1, and so on.

The above description and embodiments hereinbelow concern the zoom lens ZL of the 5-group configuration, and the below-described embodiments will show a 4-group configuration in addition to 5-group configurations, but the above configuration, conditions, etc. are also applicable to other group configurations, e.g., a 6-group configuration. For example, the above embodiment showed the configuration wherein the lens system was composed of the five movable groups, but it is also possible to add another lens group between the lens groups, or to add another lens group adjacent to the lens system on the image side or on the object side. A lens group refers to a portion having at least one lens, which is separated by an air space varying during carrying out zooming.

It is also possible to adopt a focusing lens group which effects focusing from an infinite object to a close object by moving a single lens group or two or more lens groups, or a partial lens group in the direction of the optical axis. In this case, the focusing lens group is also applicable to autofocus and is also suitable for driving by a motor (such as an ultrasonic motor) for autofocus. Particularly, the front lens group G5F forming the lens group closest to the image (the fifth lens group G5 in the case of the foregoing embodiment) is preferably composed of a focusing lens group.

In the embodiment of the present invention, in order to prevent a failure in photography due to image blurring caused by hand shakes or the like likely to occur in the zoom lens of a high zoom ratio, the lens system may be combined with a vibration detecting system for detecting vibration of the lens system, and a driving unit; the whole or part of one lens group among those forming the lens system is arranged as an antivibration lens group to be decentered; the driving unit drives the antivibration lens group so as to correct for the image blurring (fluctuations of the position of the image plane) due to vibration of the lens system detected by the vibration detecting system; the image is shifted thereby to correct for the image blurring. Particularly, the second lens group G2 or the third lens group G3 or the fourth lens group G4 is preferably configured as the antivibration lens group. In this manner, the zoom lens ZL of the present embodiment can be made to function as a so-called antivibration optical system.

In the zoom lens ZL as described above, a lens surface may be an aspherical surface. In this case, the aspherical surface may be any one of an aspherical surface made by grinding, a glass mold aspherical surface molded in an aspherical shape of glass with a mold, and a composite aspherical surface formed in an aspherical shape of a resin on a surface of glass.

The aperture stop S is preferably located near the third lens group G3, but a lens frame may be used in place of the aperture stop so as to exercise the function thereof, without provision of any member as the aperture stop.

Furthermore, each lens surface may be coated with an antireflection film having high transmittance in a wide wavelength range, which reduces flares and ghosts and achieves high optical performance with high contrast.

The embodiment of the present invention was described with the constituent features of the embodiment in order to explain the invention comprehensibly, but it is needless to mention that the present invention is by no means limited to them.

Embodiments

Each of embodiments of the present invention will be described below on the basis of the accompanying drawings. FIG. 1 is a drawing showing a refracting power layout of a zoom lens ZL according to the present embodiment, which is constructed in the 5-group configuration, and a state of movement of each of lens groups with a change in the focal length state from the wide-angle end state (W) to the telephoto end state (T). As shown in this FIG. 1, the zoom lens ZL of the present embodiment is composed of the following components in the order from the object side: a first lens group G1 having a positive refracting power; a second lens group G2 having a negative refracting power; a third lens group G3 having a positive refracting power; a fourth lens group G4 having a positive refracting power; a fifth lens group G5 having a positive refracting power; and a filter group FL consisting of a low-pass filter, an infrared cut filter, and so on. With the change in the focal length state from the wide-angle end state to the telephoto end state (i.e., during carrying out zooming), the first lens group G1 moves relative to the image plane, the space between the first lens group G1 and the second lens group G2 varies, the space between the second lens group G2 and the third lens group G3 decreases, the space between the third lens group G3 and the fourth lens group G4 decreases, the space between the fourth lens group G4 and the fifth lens group G5 increases, the first lens group G1, the third lens group G3, and the fourth lens group G4 move to the object side, the second lens group G2 moves, and the fifth lens group G5 is stationary.

In each embodiment, an aspherical surface is expressed by Eq (a) below, where y is a height in a direction perpendicular to the optical axis, S(y) is a distance along the optical axis from a tangent plane at a top of the aspherical surface at the height y to the aspherical surface (sag), r is a radius of curvature of a reference spherical surface (paraxial radius of curvature), κ is the conic constant, and An is the nth-order aspheric coefficient. In the embodiments hereinafter "E-n" represents "×10$^{-n}$."

$$S(y)=(y^2/r)/\{1+(1-\kappa\times y^2/r^2)^{1/2}\}+A4\times y^4+A6\times y^6+A8\times y^8+A10\times y^{10} \quad (a)$$

In each embodiment, the second-order aspheric coefficient A2 is 0. In the tables of the embodiments, each aspherical surface is provided with mark* on the left side of a surface number.

First Embodiment

Figure 2:
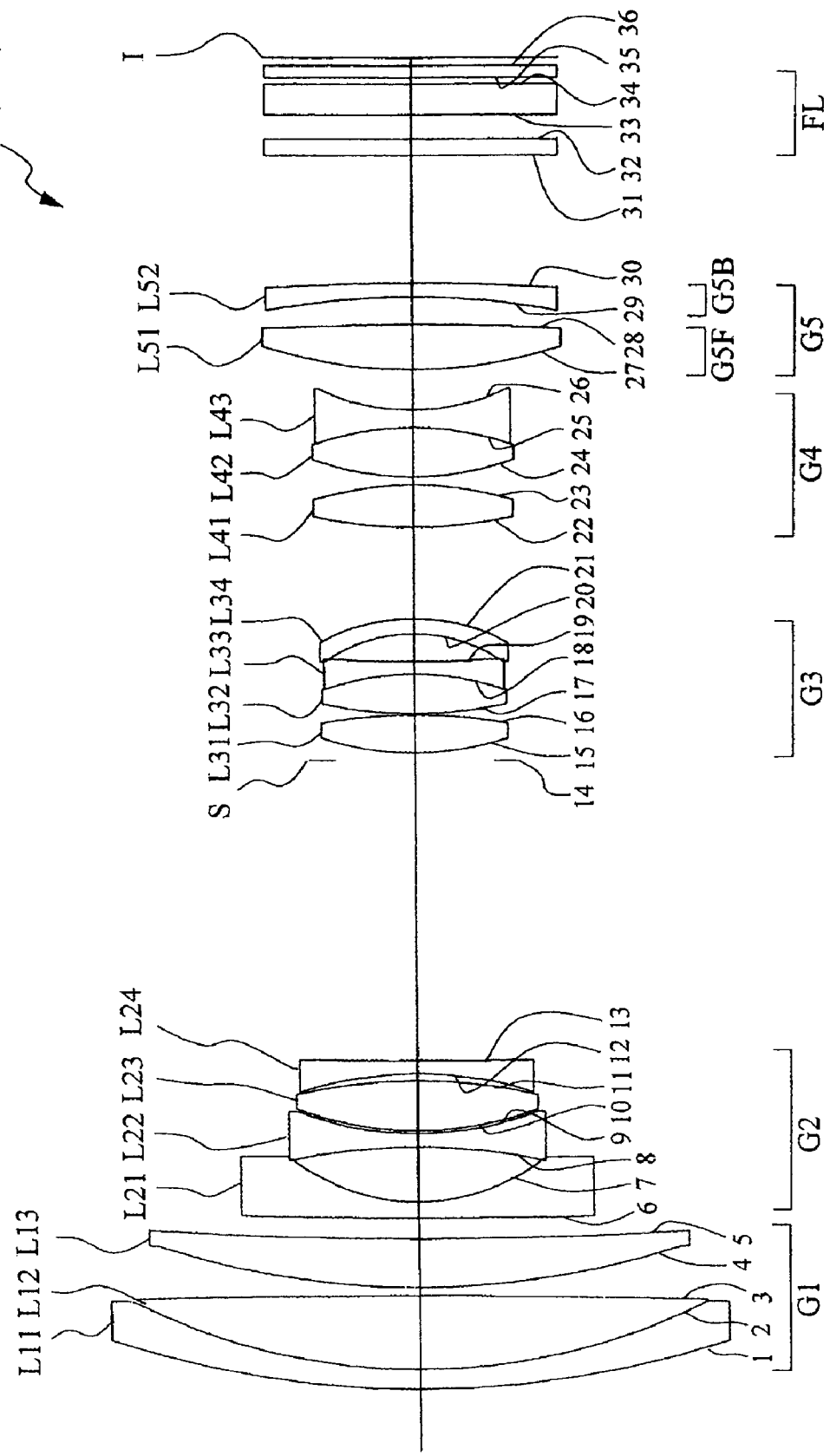
FIG. 2 is a sectional view showing a configuration of a zoom lens according to a first embodiment.

FIG. 2 is a drawing showing a configuration of a zoom lens ZL1 according to the first embodiment of the present invention. In this zoom lens ZL1 shown in FIG. 2, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43 cemented together, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a negative meniscus lens L52 with a concave surface on the object side. Furthermore, the filter group FL is composed of a low-pass filter, an infrared cut filter, and so on.

The image plane I is formed on an unrepresented imaging device and the imaging device is composed of a CCD, CMOS, or the like (the same also applies to the embodiments hereinafter). The aperture stop S is located in front of the third lens group G3 on the object side and moves together with the third lens group G3 during carrying out zooming from the wide-angle end state to the telephoto end state.

Table 1 below presents values of specifications in the first embodiment. In this table 1, f represents the focal length, F.NO the F number, 2ω the angle of view, and Bf the back focus. Furthermore, the surface number represents an order of a lens surface from the object side along the traveling direction of rays, and the refractive index and Abbe number represent values for the d line (λ=587.6 nm). It is noted herein that the units of the focal length f, the radius r of curvature, surface separation d, and other lengths presented in all the specification values below are "mm" in general, but the unit does not have to be limited to it because the optical system provides equivalent optical performance even if it is proportionally enlarged or reduced. The radius of curvature, 0.0000, indicates a plane and the refractive index of air, 1.00000, is omitted. These definitions of symbols and specification tables also apply similarly to the embodiments hereinafter. In table 1 below, W presents wide-angle end state, IFL1 intermediate focal length state 1, IFL2 intermediate focal length state 2, and T telephoto end state. Furthermore, in table 1 below, s presents Surface number, r Radius of curvature, d Surface separation, n Refractive index, and ν Abbe number.

TABLE 1

| | W | | IFL1 | | IFL2 | | T |
|---|---|---|---|---|---|---|---|
| f = | 10.51 | ~ | 26.50 | ~ | 70.00 | ~ | 107.09 |
| F. NO = | 2.79 | ~ | 4.05 | ~ | 5.65 | ~ | 5.88 |
| 2ω = | 80.74 | ~ | 34.57 | ~ | 13.42 | ~ | 8.84 |
| total length = | 83.08 | ~ | 97.01 | ~ | 121.72 | ~ | 130.00 |
| image height = | 8.50 | ~ | 8.50 | ~ | 8.50 | ~ | 8.50 |

| s | r | d | n | ν |
|---|---|---|---|---|
| 1 | 60.1977 | 1.20 | 1.84666 | 23.78 |
| 2 | 38.7538 | 4.53 | 1.49700 | 81.54 |
| 3 | −796.1320 | 0.50 | | |
| 4 | 50.7820 | 3.00 | 1.64850 | 53.03 |
| 5 | 248.3879 | (d5) | | |
| 6 | 400.0000 | 1.00 | 1.80139 | 45.45 |
| *7 | 12.0931 | 3.39 | | |
| 8 | −38.3755 | 0.85 | 1.77250 | 49.60 |
| 9 | 20.5070 | 0.16 | | |
| 10 | 20.4766 | 3.14 | 1.80810 | 22.76 |
| 11 | −31.7038 | 0.45 | | |
| 12 | −23.2526 | 0.85 | 1.75500 | 52.32 |
| 13 | 809.1098 | (d13) | | |
| 14 | 0.0000 | 0.50 | | (aperture stop S) |
| 15 | 17.9565 | 2.41 | 1.61800 | 63.33 |
| 16 | −32.0861 | 0.10 | | |
| 17 | 26.8959 | 2.47 | 1.49700 | 81.54 |
| 18 | −16.6775 | 0.80 | 1.88300 | 40.76 |
| 19 | 85.1968 | 1.75 | | |
| 20 | −9.4552 | 0.94 | 1.80139 | 45.45 |
| *21 | −12.6387 | (d21) | | |
| 22 | 29.4653 | 2.63 | 1.61800 | 63.33 |
| *23 | −18.1939 | 0.50 | | |
| 24 | 18.5749 | 3.06 | 1.60300 | 65.44 |
| 25 | −18.3613 | 1.09 | 1.77250 | 49.60 |
| 26 | 13.2806 | (d26) | | |
| 27 | 29.6484 | 2.80 | 1.49700 | 81.54 |
| 28 | −199.5333 | 1.73 | | |
| 29 | −47.4582 | 0.85 | 1.71300 | 53.86 |
| 30 | −136.3316 | (d30) | | |
| 31 | 0.0000 | 1.00 | 1.51680 | 64.12 |
| 32 | 0.0000 | 1.50 | | |
| 33 | 0.0000 | 1.87 | 1.51680 | 64.12 |
| 34 | 0.0000 | 0.40 | | |
| 35 | 0.0000 | 0.70 | 1.51680 | 64.12 |
| 36 | 0.0000 | (Bf) | | |

In this first embodiment, each lens surface of the seventh surface, the twenty first surface, and the twenty third surface is formed in an aspherical shape. Table 2 below provides data of the aspherical surfaces, i.e., values of the radius R of curvature at the top, the conic constant κ, and the aspheric constants A4-A10.

TABLE 2

| R | κ | A4 | A6 | A8 | A10 |
|---|---|---|---|---|---|
| [7th surface] | | | | | |
| 12.0931 | +1.4334 | −5.5195E−5 | −5.9679E−7 | +2.1628E−9 | −8.4730E−11 |
| [21st surface] | | | | | |
| −12.6387 | −0.4185 | −1.5577E−4 | −1.0156E−6 | +2.6592E−9 | −9.3276E−11 |
| [23rd surface] | | | | | |
| −18.1939 | +3.6126 | +1.6577E−4 | +5.6884E−7 | −5.2215E−10 | +4.9556E−11 |

In this first embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 3 below presents variable spaces at each of focal lengths in the wide-angle end state, intermediate focal length state 1, intermediate focal length state 2, and the telephoto end state. In table 3 below, W presents wide-angle end state, IFL1 intermediate focal length state 1, IFL2 intermediate focal length state 2, and T telephoto end state.

TABLE 3

| | W | IFL1 | IFL2 | T |
|---|---|---|---|---|
| f | 10.5100 | 26.5000 | 70.0000 | 107.0900 |
| d5 | 1.3000 | 11.7055 | 27.4463 | 32.7112 |
| d13 | 18.9706 | 8.8428 | 3.6767 | 1.3000 |
| d21 | 5.7919 | 3.2773 | 1.8908 | 1.2000 |
| d26 | 2.5000 | 18.6717 | 34.1956 | 40.2742 |
| d30 | 7.8300 | 7.8300 | 7.8300 | 7.8300 |
| Bf | 0.5000 | 0.5000 | 0.4999 | 0.4999 |

Table 4 below presents values corresponding to the respective condition expressions in the first embodiment. In this Table 4, fw represents the focal length of the entire system, f1 the focal length of the first lens group G1, f2 the focal length of the second lens group G2, f3 the focal length of the third lens group G3, f4 the focal length of the fourth lens group G4, f5 the focal length of the fifth lens group G5, and f5F the focal length of the front lens group G5F. Since this first embodiment adopts the 5-group configuration as described above, the lens group closest to the image is the fifth lens group, and in accordance therewith, the condition expressions (1) and (2) are replaced using the focal length f5 of the fifth lens group G5 and the focal length f5F of the front lens group G5F. The definition of these symbols also applies to the embodiments hereinafter.

TABLE 4 fw = 10.5100
f1 = 63.6968
f2 = −10.2403
f3 = 36.1866
f4 = 28.9082
f5 = 100.0000
f5F = 52.1491
(1)f5/fw = 9.5147
(2)|f5F|/f5 = 0.5215

Figure 4:
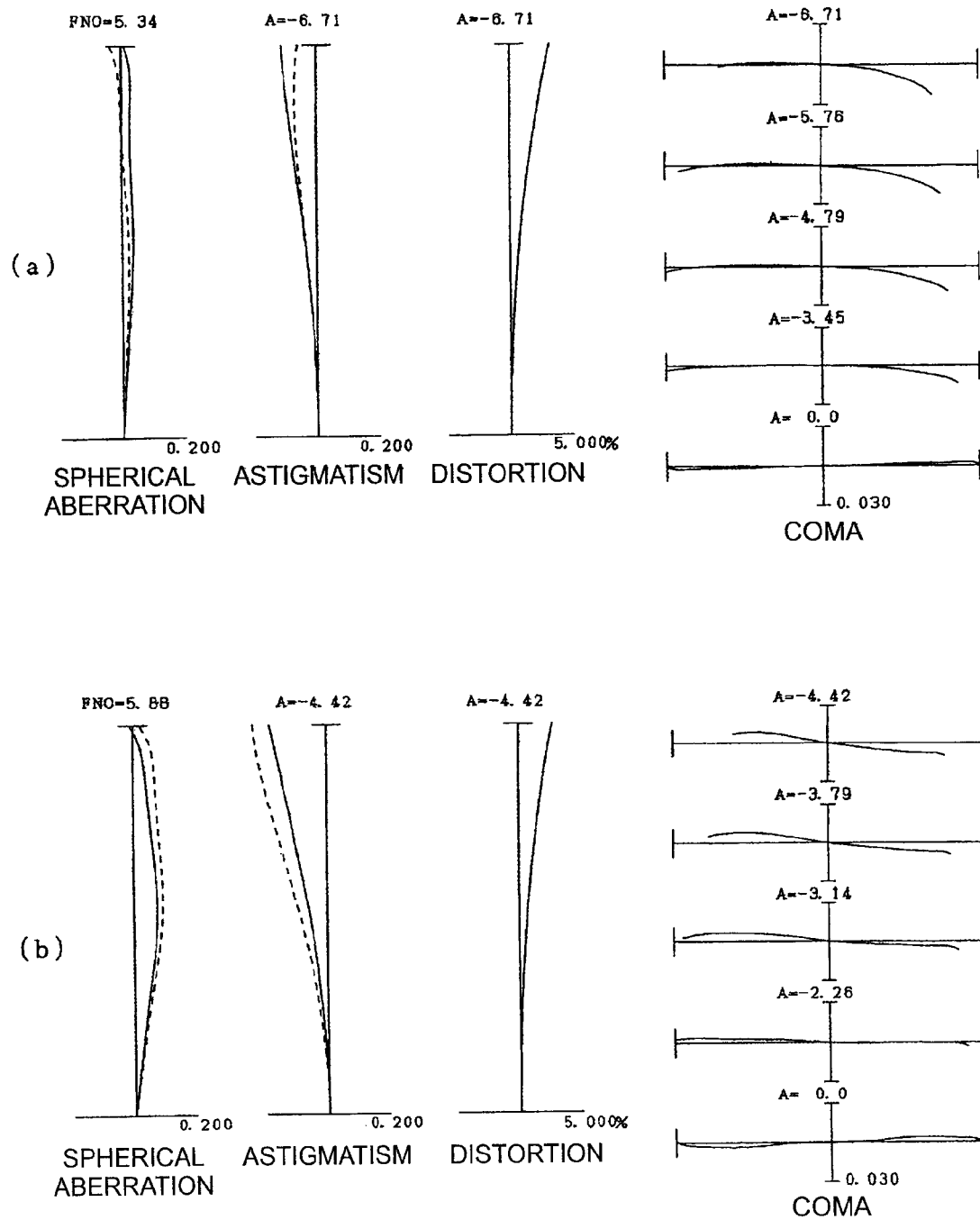
FIG. 4 is an aberration diagram showing aberrations in the infinity in-focus state in the first embodiment, wherein (a) is an aberration diagram of aberrations in an intermediate focal length state 2 and (b) is an aberration diagram of aberrations in the telephoto end state.

FIGS. 3 and 4 are aberration diagrams of aberrations in the first embodiment for the d line (λ=587.6 nm). Specifically, FIG. 3(a) is an aberration diagram of aberrations in the infinity in-focus state in the wide-angle end state (f=10.51 mm), FIG. 3(b) an aberration diagram of aberrations in the infinity in-focus state in the intermediate focal length state 1 (f=26.50 mm), FIG. 4(a) an aberration diagram of aberrations in the infinity in-focus state in the intermediate focal length state 2 (f=70.00 mm), and FIG. 4(b) an aberration diagram of aberrations in the infinity in-focus state in the telephoto end state (f=107.09 mm).

In each aberration diagram, FNO represents the F number, Y an image height, and A a half angle of view for each image height. In the aberration diagrams showing astigmatism, a solid line indicates a sagittal image surface, and a dashed line a meridional image surface. Furthermore, in the aberration diagrams showing spherical aberration, a solid line indicates spherical aberration and a dashed line a sine condition. This description of the aberration diagrams also applies similarly to the embodiments hereinafter. It is apparent from the aberration diagrams that in the first embodiment the optical system is corrected well for the aberrations in each of the focal length states ranging from the wide-angle end state to the telephoto end state, and has excellent imaging performance.

Second Embodiment

Figure 5:
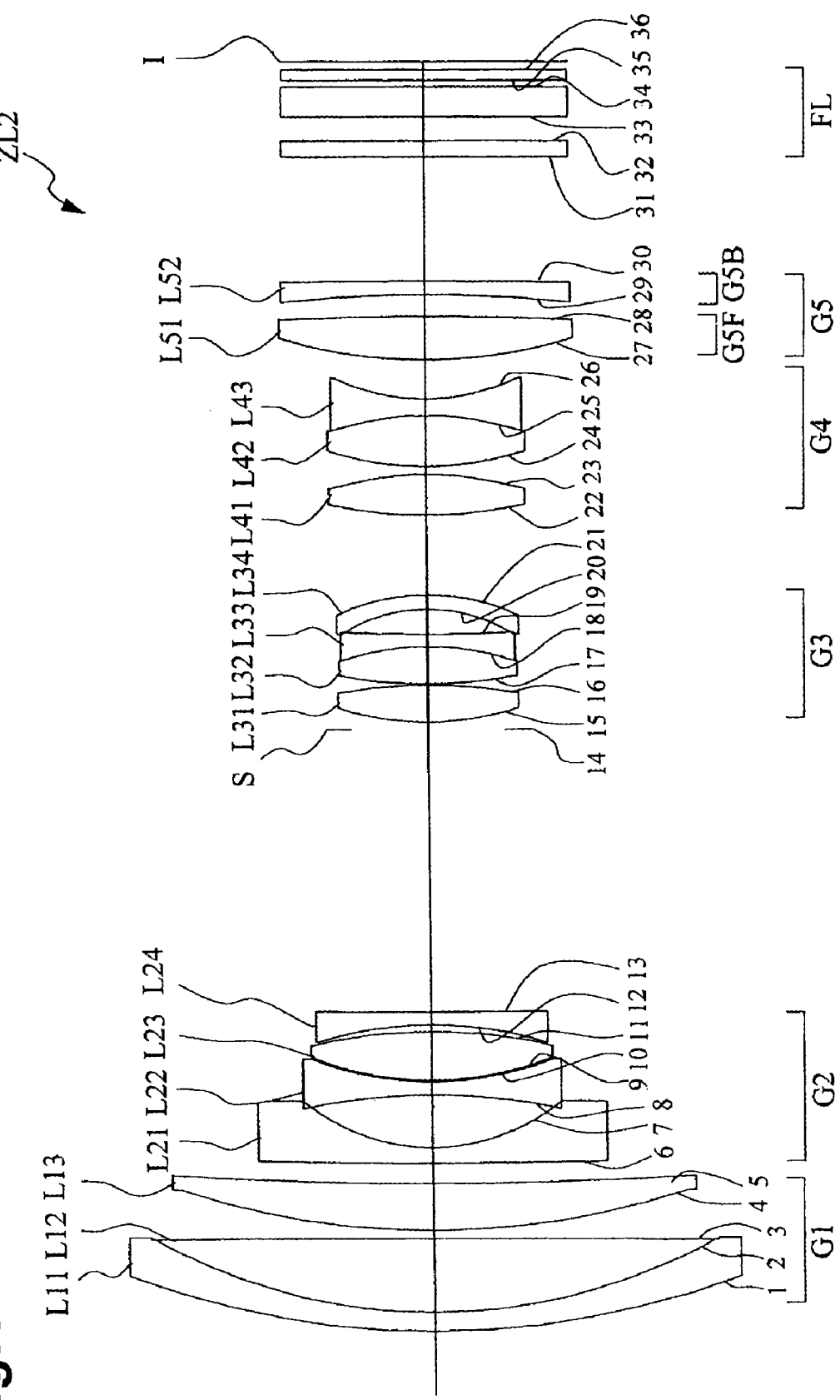
FIG. 5 is a sectional view showing a configuration of a zoom lens according to a second embodiment.

FIG. 5 is a drawing showing a configuration of a zoom lens ZL2 according to the second embodiment of the present invention. In this zoom lens ZL2 of FIG. 5, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side and a cemented negative lens consisting of a biconvex lens L42 and a biconcave lens L43 cemented together, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a negative meniscus lens L52 with a concave surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 5 below presents values of specifications of this second embodiment. In table 5 below, W presents wide-angle end state, IFL1 intermediate focal length state 1, IFL2 intermediate focal length state 2, and T telephoto end state. Furthermore, in table 5 below, s presents Surface number, r Radius of curvature, d Surface separation, n Refractive index, and ν Abbe number.

TABLE 5

| | W | | IFL1 | | IFL2 | | T |
|---|---|---|---|---|---|---|---|
| f = | 10.51 | ~ | 26.54 | ~ | 70.00 | ~ | 107.09 |
| F. NO = | 2.79 | ~ | 4.09 | ~ | 5.55 | ~ | 6.17 |
| 2ω = | 80.72 | ~ | 34.57 | ~ | 13.48 | ~ | 8.87 |
| total length = | 81.54 | ~ | 95.96 | ~ | 120.83 | ~ | 130.00 |
| image height = | 8.50 | ~ | 8.50 | ~ | 8.50 | ~ | 8.50 |

| s | r | d | n | ν | |
|---|---|---|---|---|---|
| 1 | 54.7242 | 1.20 | 1.84666 | 23.78 | |
| 2 | 36.2962 | 4.67 | 1.49700 | 81.54 | |
| 3 | −2971.4409 | 0.50 | | | |
| 4 | 50.4834 | 3.00 | 1.64850 | 53.03 | |
| 5 | 250.4980 | (d5) | | | |
| 6 | 400.0000 | 1.00 | 1.80139 | 45.45 | |
| *7 | 11.9419 | 3.38 | | | |
| 8 | −37.4745 | 0.85 | 1.77250 | 49.60 | |
| 9 | 20.4342 | 0.10 | | | |
| 10 | 20.1829 | 3.15 | 1.80810 | 22.76 | |
| 11 | −31.9455 | 0.45 | | | |
| 12 | −23.3756 | 0.85 | 1.75500 | 52.32 | |
| 13 | 675.9420 | (d13) | | | |
| 14 | 0.0000 | 0.50 | | | (aperture stop S) |
| 15 | 17.4036 | 2.40 | 1.61800 | 63.33 | |
| 16 | −32.9664 | 0.10 | | | |
| 17 | 28.6888 | 2.43 | 1.49700 | 81.54 | |
| 18 | −16.3782 | 0.80 | 1.88300 | 40.76 | |
| 19 | 126.5719 | 1.61 | | | |
| 20 | −9.9018 | 0.90 | 1.80139 | 45.45 | |
| *21 | −14.1904 | (d21) | | | |
| 22 | 27.6216 | 2.63 | 1.61800 | 63.33 | |
| *23 | −17.3250 | 0.50 | | | |
| 24 | 19.0581 | 3.26 | 1.60300 | 65.44 | |
| 25 | −18.8267 | 1.07 | 1.77250 | 49.60 | |
| 26 | 12.9358 | (d26) | | | |
| 27 | 30.9093 | 2.76 | 1.49700 | 81.54 | |
| 28 | −238.1960 | 1.43 | | | |
| 29 | −80.8143 | 0.85 | 1.71300 | 53.86 | |
| 30 | −499.9996 | (d30) | | | |
| 31 | 0.0000 | 1.00 | 1.51680 | 64.12 | |
| 32 | 0.0000 | 1.50 | | | |
| 33 | 0.0000 | 1.87 | 1.51680 | 64.12 | |
| 34 | 0.0000 | 0.40 | | | |
| 35 | 0.0000 | 0.70 | 1.51680 | 64.12 | |
| 36 | 0.0000 | (Bf) | | | |

In this second embodiment, each lens surface of the seventh surface, the twenty first surface, and the twenty third surface is formed in an aspherical shape. Table 6 below provides data of the aspherical surfaces, i.e., values of the radius R of curvature at the top, the conic constant κ, and the aspheric constants A4-A10.

TABLE 6

| R | κ | A4 | A6 | A8 | A10 |
|---|---|----|----|----|-----|
| [7th surface] | | | | | |
| 11.9419 | +1.3827 | −5.1076E−5 | −6.3562E−7 | +3.5189E−9 | −9.1566E−11 |
| [21st surface] | | | | | |
| −14.1904 | −0.6295 | −1.4203E−4 | −1.3887E−6 | +1.7135E−8 | −2.5332E−10 |
| [23rd surface] | | | | | |
| −17.3250 | +3.3515 | +1.8431E−4 | +1.1194E−6 | −1.5285E−8 | +2.2509E−10 |

In this second embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 7 below presents variable spaces at each of focal lengths in the wide-angle end state, intermediate focal length state 1, intermediate focal length state 2, and the telephoto end state. In table 7 below, W presents wide-angle end state, IFL1 intermediate focal length state 1, IFL2 intermediate focal length state 2, and T telephoto end state.

TABLE 7

|     | W       | IFL1    | IFL2    | T       |
|-----|---------|---------|---------|---------|
| f   | 10.5100 | 26.5431 | 70.0000 | 107.0900 |
| d5  | 1.3000  | 11.3200 | 25.8332 | 30.8819 |
| d13 | 18.3438 | 8.6330  | 3.5633  | 1.3000  |
| d21 | 5.2128  | 3.0386  | 1.7943  | 1.2000  |
| d26 | 2.5000  | 18.5112 | 35.4533 | 42.4334 |
| d30 | 7.8300  | 7.8300  | 7.8300  | 7.8300  |
| Bf  | 0.5000  | 0.4999  | 0.4998  | 0.4997  |

Table 8 below presents values corresponding to the respective condition expressions in this second embodiment.

TABLE 8 fw = 10.5100
f1 = 62.0449
f2 = −10.0825
f3 = 37.2598
f4 = 27.0413
f5 = 90.0000
f5F = 55.2369
(1)f5/fw = 8.5633
(2)|f5F|/f5 = 0.6137

Figure 6:
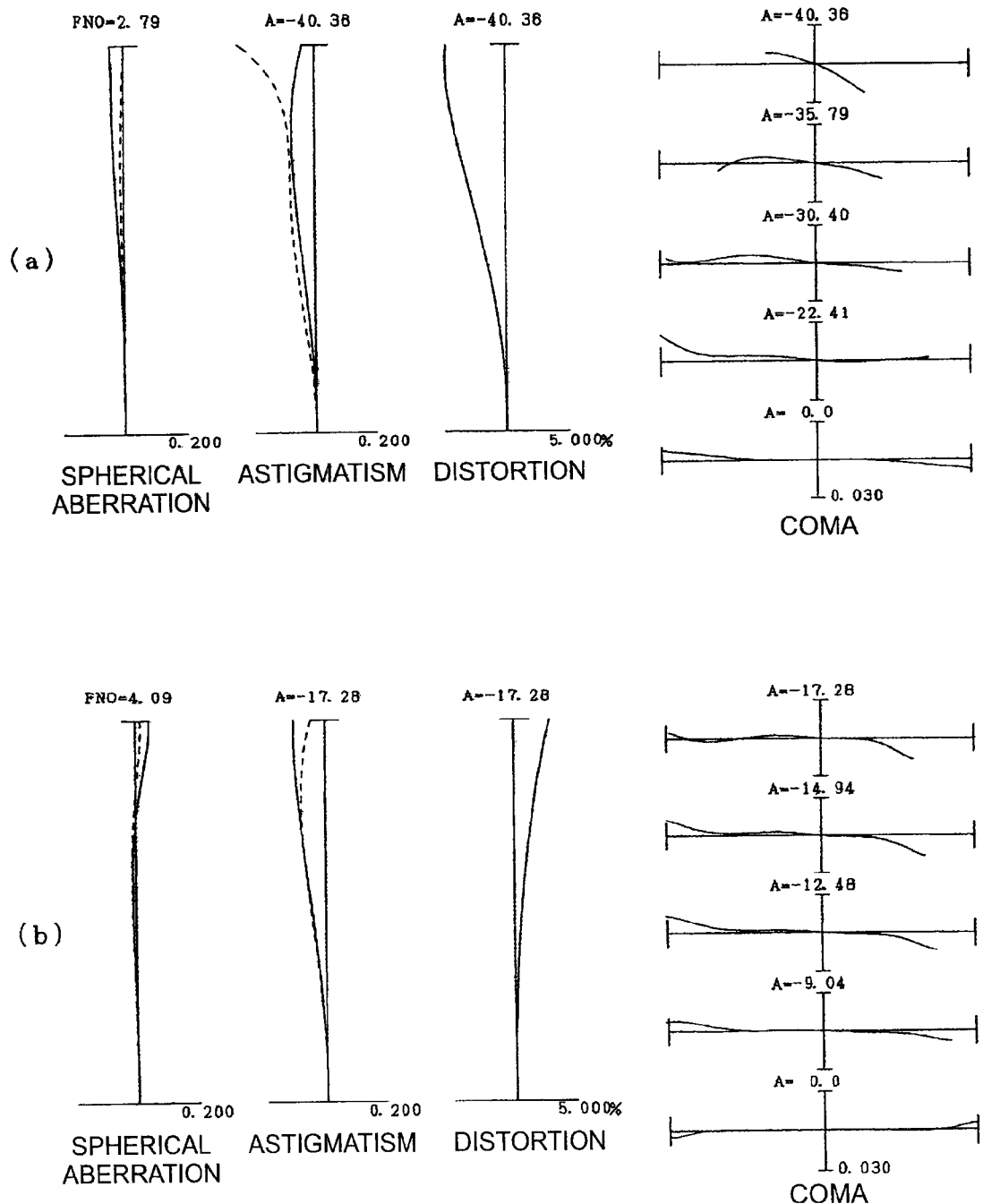
FIG. 6 is an aberration diagram showing aberrations in the infinity in-focus state in the second embodiment, wherein (a) is an aberration diagram of aberrations in the wide-angle end state and (b) is an aberration diagram of aberrations in an intermediate focal length state 1.

FIGS. 6 and 7 are aberration diagrams of aberrations in the second embodiment for the d line (λ=587.6 nm). Specifically, FIG. 6(a) is an aberration diagram of aberrations in the infinity in-focus state in the wide-angle end state (f=10.51 mm), FIG. 6(b) an aberration diagram of aberrations in the infinity in-focus state in the intermediate focal length state 1 (f=26.54 mm), FIG. 7(a) an aberration diagram of aberrations in the infinity in-focus state in the intermediate focal length state 2 (f=70.00 mm), and FIG. 7(b) an aberration diagram of aberrations in the infinity in-focus state in the telephoto end state (f=107.09 mm). It is apparent from the aberration diagrams that in the second embodiment the optical system is corrected well for the aberrations in each of the focal length states ranging from the wide-angle end state to the telephoto end state, and has excellent imaging performance.

Third Embodiment

Figure 8:
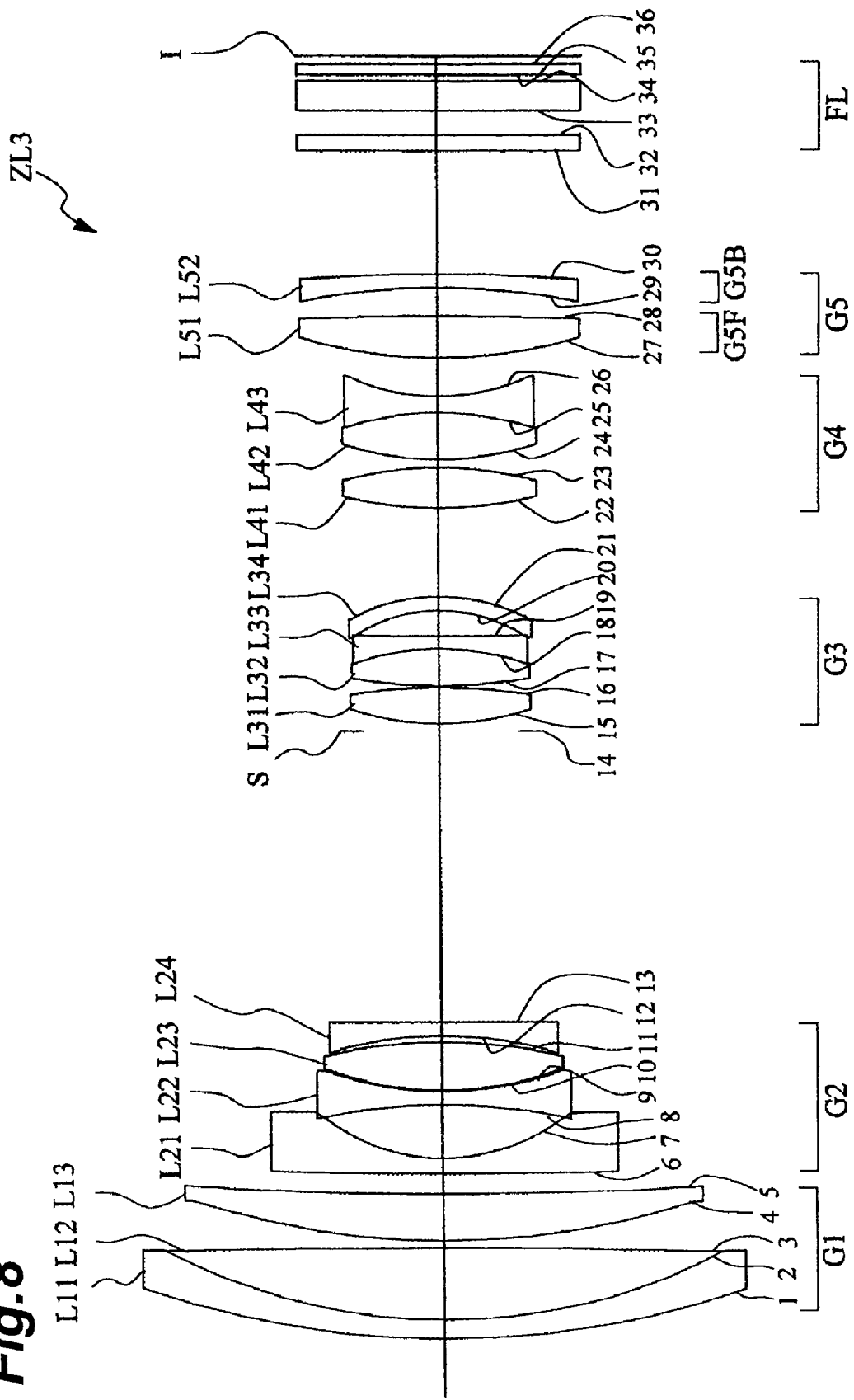
FIG. 8 is a sectional view showing a configuration of a zoom lens according to a third embodiment.

FIG. 8 is a drawing showing a configuration of a zoom lens ZL3 according to the third embodiment of the present invention. In this zoom lens ZL3 of FIG. 8, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a negative meniscus lens L52 with a concave surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 9 below presents values of specifications of this third embodiment. In table 9 below, W presents wide-angle end state, IFL1 intermediate focal length state 1, IFL2 intermediate focal length state 2, and T telephoto end state. Furthermore, in table 9 below, s presents Surface number, r Radius of curvature, d Surface separation, n Refractive index, and ν Abbe number.

TABLE 9

|         | W     |   | IFL1  |   | IFL2  |   | T      |
|---------|-------|---|-------|---|-------|---|--------|
| f =     | 10.51 | ~ | 27.12 | ~ | 70.00 | ~ | 107.09 |
| F. NO = | 2.84  | ~ | 4.15  | ~ | 5.51  | ~ | 6.11   |
| 2ω =    | 80.72 | ~ | 33.80 | ~ | 13.41 | ~ | 8.83   |

TABLE 9-continued

| total length = | 83.05 | ~ | 96.90 | ~ | 121.13 | ~ | 130.00 |
|---|---|---|---|---|---|---|---|
| image height = | 8.50 | ~ | 8.50 | ~ | 8.50 | ~ | 8.50 |

| s | r | d | n | ν | |
|---|---|---|---|---|---|
| 1 | 58.8582 | 1.20 | 1.84666 | 23.78 | |
| 2 | 38.0651 | 4.57 | 1.49700 | 81.54 | |
| 3 | −959.4532 | 0.50 | | | |
| 4 | 51.3980 | 3.00 | 1.64850 | 53.03 | |
| 5 | 269.9420 | (d5) | | | |
| 6 | 400.0000 | 1.00 | 1.80139 | 45.45 | |
| *7 | 11.8338 | 3.44 | | | |
| 8 | −36.9640 | 0.85 | 1.77250 | 49.60 | |
| 9 | 21.0104 | 0.10 | | | |
| 10 | 20.4869 | 3.14 | 1.80810 | 22.76 | |
| 11 | −31.1694 | 0.45 | | | |
| 12 | −22.9250 | 0.85 | 1.75500 | 52.32 | |
| 13 | 2252.7127 | (d13) | | | |
| 14 | 0.0000 | 0.50 | | | (aperture stop S) |
| 15 | 17.3404 | 2.39 | 1.61800 | 63.33 | |
| 16 | −34.1339 | 0.10 | | | |
| 17 | 32.0063 | 2.45 | 1.49700 | 81.54 | |
| 18 | −15.3158 | 0.80 | 1.88300 | 40.76 | |
| 19 | 135.6121 | 1.71 | | | |
| 20 | −9.4030 | 0.90 | 1.80139 | 45.45 | |
| *21 | −12.0635 | (d21) | | | |
| 22 | 26.0597 | 2.62 | 1.61800 | 63.33 | |
| *23 | −19.0777 | 0.50 | | | |
| 24 | 19.3356 | 3.04 | 1.60300 | 65.44 | |
| 25 | −18.4969 | 1.04 | 1.77250 | 49.60 | |
| 26 | 13.1843 | (d26) | | | |
| 27 | 30.0994 | 2.67 | 1.49700 | 81.54 | |
| 28 | −263.6185 | 1.85 | | | |
| 29 | −42.0550 | 0.85 | 1.71300 | 53.86 | |
| 30 | −113.6089 | (d30) | | | |
| 31 | 0.0000 | 1.00 | 1.51680 | 64.12 | |
| 32 | 0.0000 | 1.50 | | | |
| 33 | 0.0000 | 1.87 | 1.51680 | 64.12 | |
| 34 | 0.0000 | 0.40 | | | |
| 35 | 0.0000 | 0.70 | 1.51680 | 64.12 | |
| 36 | 0.0000 | (Bf) | | | |

In this third embodiment, each lens surface of the seventh surface, the twenty first surface, and the twenty third surface is formed in an aspherical shape. Table 10 below provides data of the aspherical surfaces, i.e., values of the radius R of curvature at the top, the conic constant κ, and the aspheric constants A4-A10.

TABLE 10

| R | κ | A4 | A6 | A8 | A10 |
|---|---|---|---|---|---|
| [7th surface] | | | | | |
| 11.8338 | +1.4280 | −5.6710E−5 | −6.4952E−7 | +2.4938E−9 | −9.9064E−11 |
| [21st surface] | | | | | |
| −12.0635 | +0.2305 | −1.1956E−4 | −1.1284E−6 | +4.0083E−9 | −1.2681E−10 |
| [23rd surface] | | | | | |
| −19.0777 | +1.2200 | +1.2025E−4 | +1.9364E−7 | −4.0825E−9 | +2.4438E−11 |

In the third embodiment of the present invention, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 11 below presents variable spaces at each of focal lengths in the wide-angle end state, intermediate focal length state 1, intermediate focal length state 2, and the telephoto end state. In table 11 below, W presents wide-angle end state, IFL1 intermediate focal length state 1, IFL2 intermediate focal length state 2, and T telephoto end state.

TABLE 11

| | W | IFL1 | IFL2 | T |
|---|---|---|---|---|
| f | 10.5100 | 26.5431 | 70.0000 | 107.0900 |
| d5 | 1.3000 | 11.8923 | 26.7670 | 31.9657 |
| d13 | 19.0759 | 8.6429 | 3.5950 | 1.3000 |
| d21 | 5.8553 | 3.2812 | 1.8936 | 1.2000 |
| d26 | 2.5000 | 18.7655 | 34.5540 | 41.2143 |
| d30 | 7.8300 | 7.8300 | 7.8300 | 7.8300 |
| Bf | 0.5000 | 0.5000 | 0.5000 | 0.5000 |

Table 12 below presents values corresponding to the respective condition expressions in the third embodiment of the present invention.

TABLE 12 fw = 10.5100
f1 = 63.3179
f2 = −10.1436
f3 = 35.7603
f4 = 29.3060
f5 = 120.0002
f5F = 54.5205
(1)f5/fw = 11.4177
(2)|f5F|/f5 = 0.4543

Figure 9:
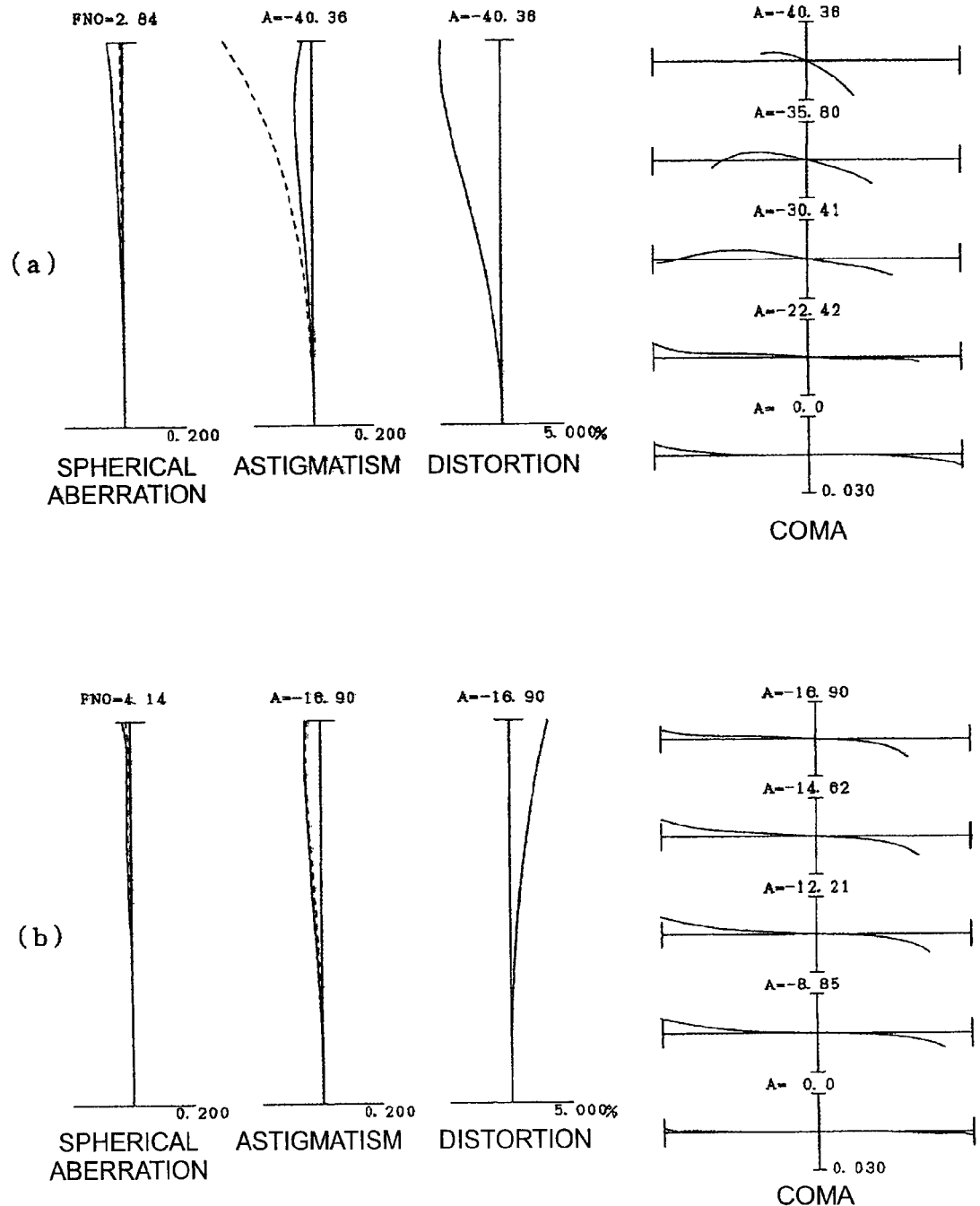
FIG. 9 is an aberration diagram showing aberrations in the infinity in-focus state in the third embodiment, wherein (a) is an aberration diagram of aberrations in the wide-angle end state and (b) is an aberration diagram of aberrations in an intermediate focal length state 1.
Figure 10:
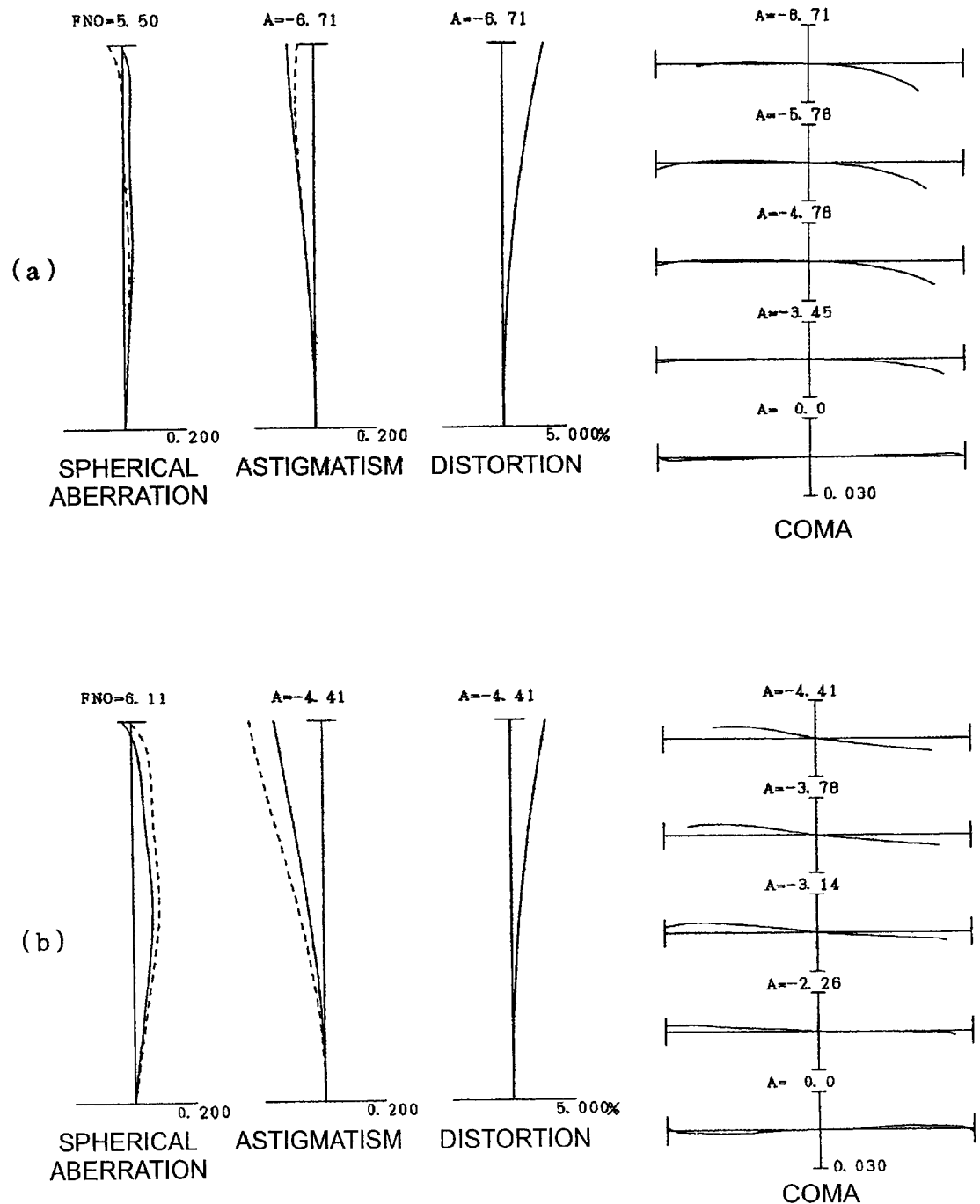
FIG. 10 is an aberration diagram showing aberrations in the infinity in-focus state in the third embodiment, wherein (a) is an aberration diagram of aberrations in an intermediate focal length state 2 and (b) is an aberration diagram of aberrations in the telephoto end state.

FIGS. 9 and 10 are aberration diagrams of aberrations in the third embodiment for the d line (λ=587.6 nm). Specifically, FIG. 9(a) is an aberration diagram of aberrations in the infinity in-focus state in the wide-angle end state (f=10.51 mm), FIG. 9(b) an aberration diagram of aberrations in the infinity in-focus state in the intermediate focal length state 1 (f=26.54 mm), FIG. 10(a) an aberration diagram of aberrations in the infinity in-focus state in the intermediate focal length state 2 (f=70.00 mm), and FIG. 10(b) an aberration diagram of aberrations in the infinity in-focus state in the telephoto end state (f=107.09 mm). It is apparent from the aberration diagrams that in the third embodiment the optical system is corrected well for the aberrations in each of the focal length states ranging from the wide-angle end state to the telephoto end state, and has excellent imaging performance.

Fourth Embodiment

Figure 11:
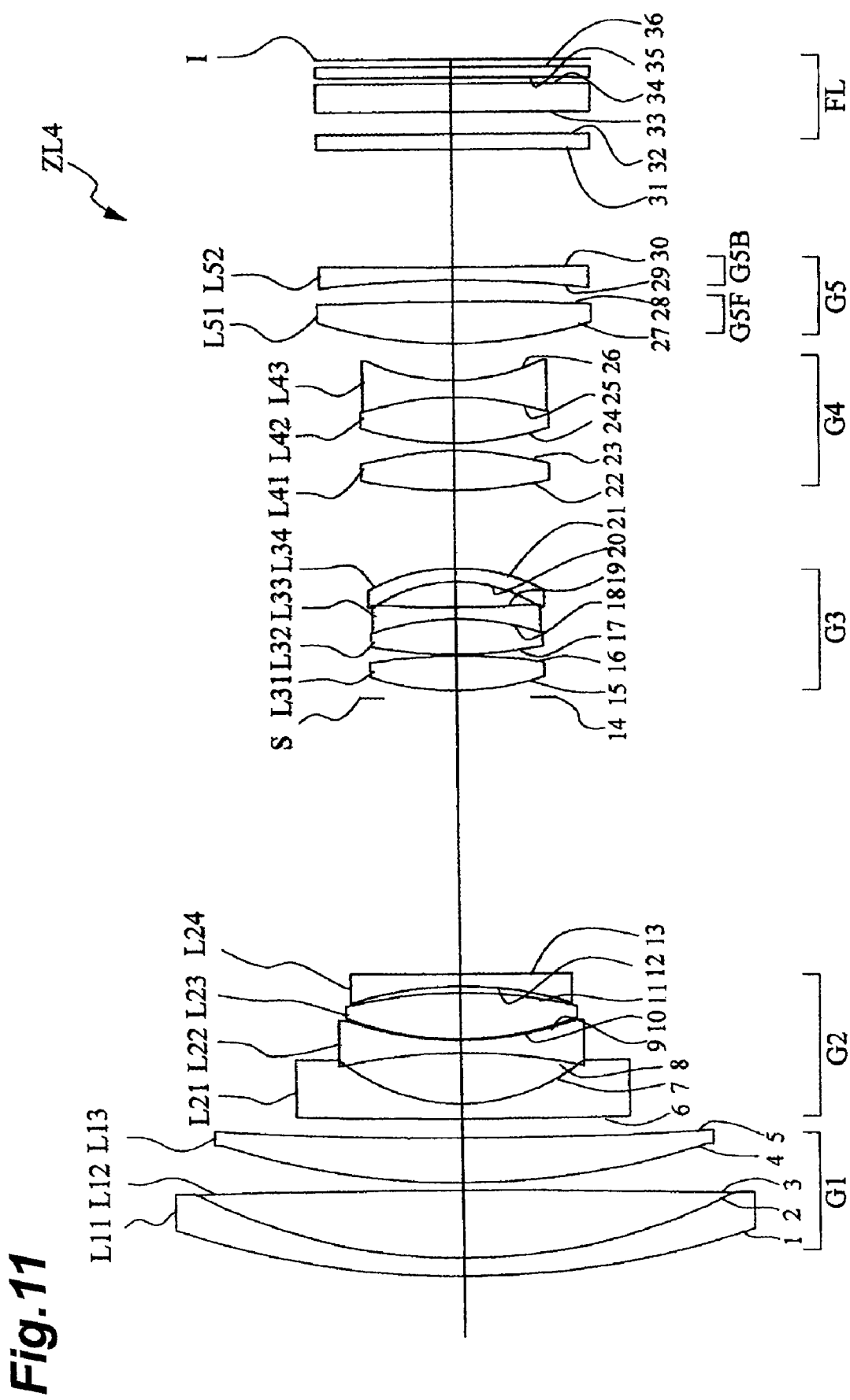
FIG. 11 is a sectional view showing a configuration of a zoom lens according to a fourth embodiment.

FIG. 11 is a drawing showing a configuration of a zoom lens ZL4 according to the fourth embodiment of the present invention. In this zoom lens ZL4 of FIG. 11, the first lens group G1 is composed of a cemented positive lens consisting of a negative meniscus lens L11 with a convex surface on the object side and a biconvex lens L12 cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side and a cemented negative lens consisting of a biconvex lens L42 and a biconcave lens L43 cemented together, which are arranged in the order from the object side. The fifth lens group G5 is composed of a front lens group G5F and a rear lens group G5B in the order from the object side, the front lens group G5F is composed of a biconvex lens L51, and the rear lens group G5B is composed of a biconcave lens L52. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 13 below presents values of specifications of this fourth embodiment. In table 13 below, W presents wide-angle end state, IFL1 intermediate focal length state 1, IFL2 intermediate focal length state 2, and T telephoto end state. Furthermore, in table 13 below, s presents Surface number, r Radius of curvature, d Surface separation, n Refractive index, and ν Abbe number.

TABLE 13

| | W | | IFL1 | | IFL2 | | T |
|---|---|---|---|---|---|---|---|
| f = | 10.51 | ~ | 27.07 | ~ | 70.00 | ~ | 107.09 |
| F. NO = | 2.86 | ~ | 4.16 | ~ | 5.52 | ~ | 6.10 |
| 2ω = | 80.72 | ~ | 33.91 | ~ | 13.46 | ~ | 8.87 |
| total length = | 82.35 | ~ | 96.47 | ~ | 121.05 | ~ | 130.00 |
| image height = | 8.50 | ~ | 8.50 | ~ | 8.50 | ~ | 8.50 |

| s | r | d | n | ν |
|---|---|---|---|---|
| 1 | 60.3517 | 1.20 | 1.84666 | 23.78 |
| 2 | 38.6900 | 4.54 | 1.49700 | 81.54 |
| 3 | −760.8752 | 0.50 | | |
| 4 | 51.3280 | 3.00 | 1.64850 | 53.03 |
| 5 | 266.1629 | (d5) | | |
| 6 | 400.0000 | 1.00 | 1.80139 | 45.45 |
| *7 | 11.9226 | 3.41 | | |
| 8 | −38.0034 | 0.85 | 1.77250 | 49.60 |
| 9 | 20.9591 | 0.10 | | |
| 10 | 20.4170 | 3.13 | 1.80810 | 22.76 |
| 11 | −31.7846 | 0.45 | | |
| 12 | −23.2098 | 0.85 | 1.75500 | 52.32 |
| 13 | 1078.0804 | (d13) | | |
| 14 | 0.0000 | 0.50 | | (aperture stop S) |
| 15 | 16.9245 | 2.40 | 1.61800 | 63.33 |
| 16 | −35.2984 | 0.10 | | |
| 17 | 27.5533 | 2.44 | 1.49700 | 81.54 |
| 18 | −16.6265 | 0.80 | 1.88300 | 40.76 |
| 19 | 83.0049 | 1.75 | | |
| 20 | −9.3778 | 0.92 | 1.80139 | 45.45 |
| *21 | −12.5377 | (d21) | | |
| 22 | 27.2733 | 2.70 | 1.61800 | 63.33 |
| *23 | −18.2166 | 0.50 | | |
| 24 | 18.6734 | 3.09 | 1.60300 | 65.44 |
| 25 | −18.8139 | 1.13 | 1.77250 | 49.60 |
| 26 | 13.0861 | (d26) | | |
| 27 | 28.7681 | 2.80 | 1.49700 | 81.54 |
| 28 | −216.4083 | 1.45 | | |
| 29 | −72.3074 | 0.85 | 1.71300 | 53.86 |
| 30 | 400.0000 | (d30) | | |
| 31 | 0.0000 | 1.00 | 1.51680 | 64.12 |
| 32 | 0.0000 | 1.50 | | |
| 33 | 0.0000 | 1.87 | 1.51680 | 64.12 |
| 34 | 0.0000 | 0.40 | | |
| 35 | 0.0000 | 0.70 | 1.51680 | 64.12 |
| 36 | 0.0000 | (Bf) | | |

In this fourth embodiment, each lens surface of the seventh surface, the twenty first surface, and the twenty third surface is formed in an aspherical shape. Table 14 below provides data of the aspherical surfaces, i.e., values of the radius R of curvature at the top, the conic constant κ, and the aspheric constants A4-A10.

TABLE 14

| R | κ | A4 | A6 | A8 | A10 |
|---|---|---|---|---|---|
| | | [7th surface] | | | |
| 11.9226 | +1.3659 | −5.0025E−5 | −5.3740E−7 | +1.1498E−9 | −6.4741E−11 |
| | | [21st surface] | | | |
| −12.5377 | +0.4772 | −1.0474E−4 | −1.2084E−6 | +6.6440E−9 | −1.5690E−10 |
| | | [23rd surface] | | | |
| −18.2166 | +1.6429 | +1.3970E−4 | +3.5688E−7 | −5.8207E−9 | +4.5546E−11 |

In this fourth embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 15 below presents variable spaces at each of focal lengths in the wide-angle end state, intermediate focal length state 1, intermediate focal length state 2, and the telephoto end state. In table 15 below, W presents wide-angle end state, IFL1 intermediate focal length state 1, IFL2 intermediate focal length state 2, and T telephoto end state.

TABLE 15

|  | W | IFL1 | IFL2 | T |
|---|---|---|---|---|
| f | 10.5100 | 27.0670 | 70.0000 | 107.0900 |
| d5 | 1.3000 | 11.9021 | 26.8722 | 32.1472 |
| d13 | 18.9706 | 8.6536 | 3.5985 | 1.3000 |
| d21 | 5.3129 | 3.0414 | 1.8111 | 1.2000 |
| d26 | 2.5000 | 18.6074 | 34.4947 | 41.0863 |
| d30 | 7.8300 | 7.8300 | 7.8300 | 7.8300 |
| Bf | 0.5000 | 0.5000 | 0.5000 | 0.4999 |

Table 16 below presents values corresponding to the respective condition expressions in the fourth embodiment of the present invention.

TABLE 16 fw = 10.5100
f1 = 63.6561
f2 = −10.2152
f3 = 36.7435
f4 = 27.7301
f5 = 116.6907
f5F = 51.2866
(1)f5/fw = 11.1028
(2)|f5F|/f5 = 0.4395

FIGS. 12 and 13 are aberration diagrams of aberrations in the fourth embodiment for the d line (λ=587.6 nm). Specifically, FIG. 12(a) is an aberration diagram of aberrations in the infinity in-focus state in the wide-angle end state (f=10.51 mm), FIG. 12(b) an aberration diagram of aberrations in the infinity in-focus state in the intermediate focal length state 1 (f=27.07 mm), FIG. 13(a) an aberration diagram of aberrations in the infinity in-focus state in the intermediate focal length state 2 (f=70.00 mm), and FIG. 13(b) an aberration diagram of aberrations in the infinity in-focus state in the telephoto end state (f=107.09 mm). It is apparent from the aberration diagrams that in the fourth embodiment the optical system is corrected well for the aberrations in each of the focal length states ranging from the wide-angle end state to the telephoto end state, and has excellent imaging performance.

Fifth Embodiment

Figure 14:
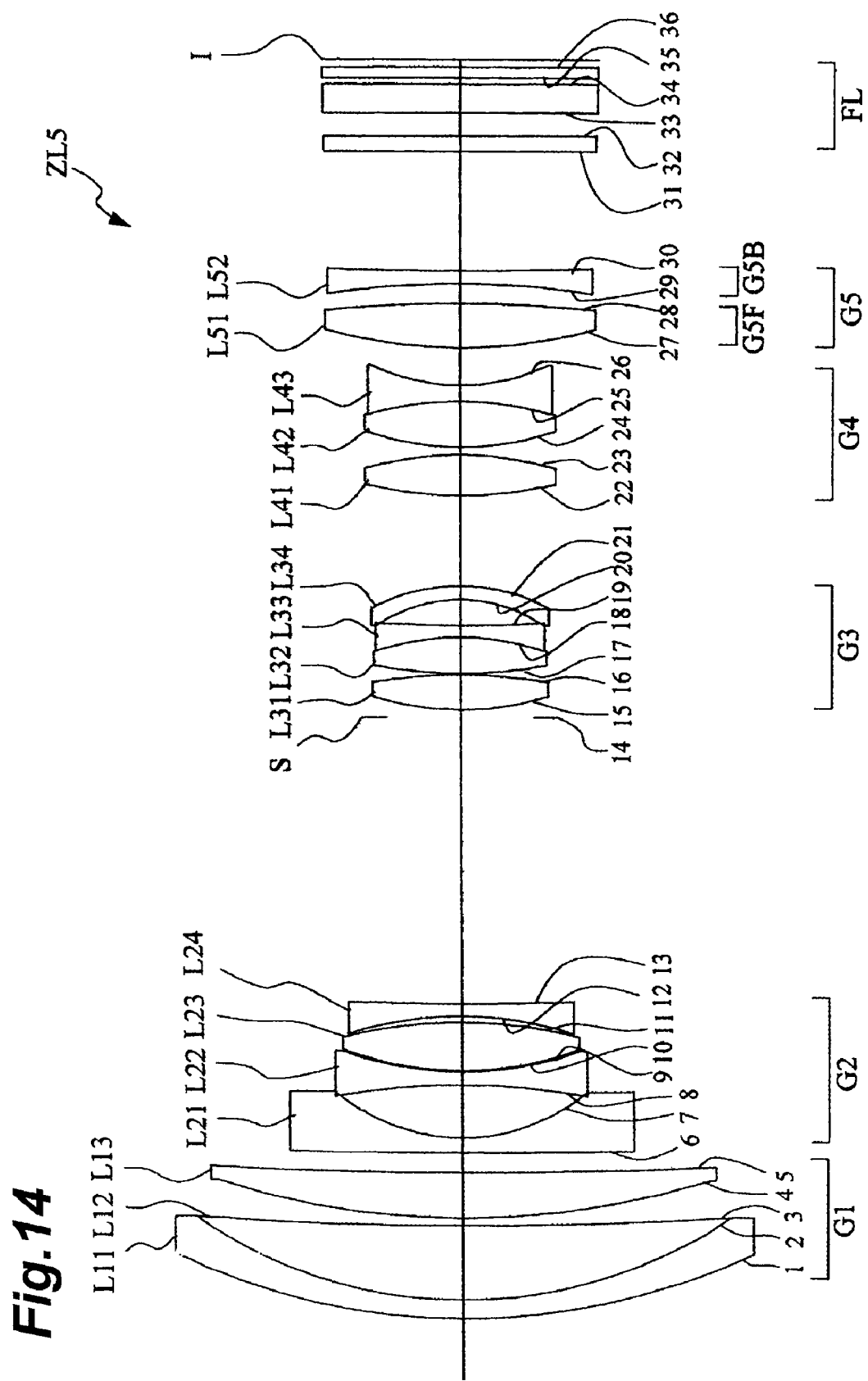
FIG. 14 is a sectional view showing a configuration of a zoom lens according to a fifth embodiment.

FIG. 14 is a drawing showing a configuration of a zoom lens ZL5 according to the fifth embodiment of the present invention. In this zoom lens ZL5 of FIG. 14, the first lens group G1 is composed of a cemented positive lens consisting of a negative meniscus lens L11 with a convex surface on the object side and a positive meniscus lens L12 with a convex surface on the object side cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a biconcave lens L24, which are arranged in the order from the object side. The third lens group G3 is composed of a biconvex lens L31, a cemented negative lens consisting of a biconvex lens L32 and a biconcave lens L33 cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43 cemented together, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a biconcave lens L52. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 17 below presents values of specifications of the fifth embodiment of the present invention. In table 17 below, W presents wide-angle end state, IFL1 intermediate focal length state 1, IFL2 intermediate focal length state 2, and T telephoto end state. Furthermore, in table 17 below, s presents Surface number, r Radius of curvature, d Surface separation, n Refractive index, and ν Abbe number.

TABLE 17

|  | W |  | IFL1 |  | IFL2 |  | T |
|---|---|---|---|---|---|---|---|
| f = | 10.51 | ~ | 28.19 | ~ | 70.00 | ~ | 107.09 |
| F. NO = | 2.88 | ~ | 4.30 | ~ | 5.75 | ~ | 6.49 |
| 2ω = | 80.80 | ~ | 32.83 | ~ | 13.53 | ~ | 8.90 |
| total length = | 83.95 | ~ | 96.49 | ~ | 119.79 | ~ | 130.00 |
| image height = | 8.50 | ~ | 8.50 | ~ | 8.50 | ~ | 8.50 |

| s | r | d | n | ν |
|---|---|---|---|---|
| 1 | 43.9330 | 1.20 | 1.84666 | 23.78 |
| 2 | 30.5400 | 4.88 | 1.49700 | 81.54 |
| 3 | 243.7557 | 0.50 | | |
| 4 | 52.2061 | 3.00 | 1.65844 | 50.88 |
| 5 | 314.5167 | (d5) | | |
| 6 | 400.0000 | 1.00 | 1.80139 | 45.45 |
| *7 | 11.8775 | 3.52 | | |
| 8 | −42.8819 | 0.85 | 1.77250 | 49.60 |
| 9 | 21.5771 | 0.10 | | |
| 10 | 21.3255 | 3.22 | 1.80810 | 22.76 |
| 11 | −30.3888 | 0.45 | | |
| 12 | −22.5541 | 0.85 | 1.75500 | 52.32 |
| 13 | 243.2082 | (d13) | | |
| 14 | 0.0000 | 0.50 | | (aperture stop S) |
| 15 | 18.2993 | 2.37 | 1.61800 | 63.33 |
| 16 | −30.7489 | 0.10 | | |
| 17 | 29.3039 | 2.43 | 1.49700 | 81.54 |
| 18 | −16.1386 | 0.80 | 1.88300 | 40.76 |
| 19 | 98.6500 | 1.74 | | |
| 20 | −9.2926 | 0.90 | 1.80139 | 45.45 |
| *21 | −12.4260 | (d21) | | |
| 22 | 25.3953 | 2.73 | 1.61800 | 63.33 |
| *23 | −18.1158 | 0.50 | | |
| 24 | 18.3397 | 3.07 | 1.60300 | 65.44 |
| 25 | −20.5837 | 1.07 | 1.77250 | 49.60 |
| 26 | 12.6024 | (d26) | | |
| 27 | 31.5264 | 2.95 | 1.49700 | 81.54 |
| 28 | −83.3169 | 1.30 | | |
| 29 | −55.6734 | 0.85 | 1.75500 | 52.32 |
| 30 | 254.3544 | (d30) | | |
| 31 | 0.0000 | 1.00 | 1.51680 | 64.12 |
| 32 | 0.0000 | 1.50 | | |
| 33 | 0.0000 | 1.87 | 1.51680 | 64.12 |
| 34 | 0.0000 | 0.40 | | |
| 35 | 0.0000 | 0.70 | 1.51680 | 64.12 |
| 36 | 0.0000 | (Bf) | | |

In this fifth embodiment, each lens surface of the seventh surface, the twenty first surface, and the twenty third surface is formed in an aspherical shape. Table 18 below provides data of the aspherical surfaces, i.e., values of the radius of curvature R at the top, the conic constant κ, and the aspheric constants A4-A10.

TABLE 18

| R | κ | A4 | A6 | A8 | A10 |
|---|---|---|---|---|---|
| [7th surface] | | | | | |
| 11.8775 | +1.3712 | −5.4948E−5 | −6.0657E−7 | +2.3336E−9 | −9.4454E−11 |
| [21st surface] | | | | | |
| −12.4260 | +0.9206 | −7.3557E−5 | −1.0278E−6 | +6.5107E−9 | −1.3480E−10 |
| [23rd surface] | | | | | |
| −18.1158 | +2.4384 | +1.4932E−4 | +5.1226E−7 | −8.8221E−9 | +8.9061E−11 |

In this fifth embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 19 below presents variable spaces at each of focal lengths in the wide-angle end state, intermediate focal length state 1, intermediate focal length state 2, and the telephoto end state. In table 19 below, W presents wide-angle end state, IFL1 intermediate focal length state 1, IFL2 intermediate focal length state 2, and T telephoto end state.

TABLE 19

| | W | IFL1 | IFL2 | T |
|---|---|---|---|---|
| f | 10.5100 | 28.1920 | 70.0000 | 107.0899 |
| d5 | 1.3000 | 10.8833 | 24.2578 | 29.0793 |
| d13 | 19.3989 | 8.1858 | 3.4362 | 1.3000 |
| d21 | 6.0878 | 3.3311 | 1.9099 | 1.2000 |
| d26 | 2.5000 | 19.4292 | 35.5250 | 43.7557 |
| d30 | 7.8300 | 7.8300 | 7.8300 | 7.8300 |
| Bf | 0.5000 | 0.5000 | 0.5000 | 0.5000 |

Table 20 below presents values corresponding to the respective condition expressions in this fifth embodiment.

TABLE 20 fw = 10.5100
f1 = 61.8954
f2 = −10.0406
f3 = 38.0181
f4 = 26.5741
f5 = 166.5206
f5R = 46.4161
(1)f5/fw = 15.8440
(2)|f5R|/f5 = 0.2787

Figure 15:
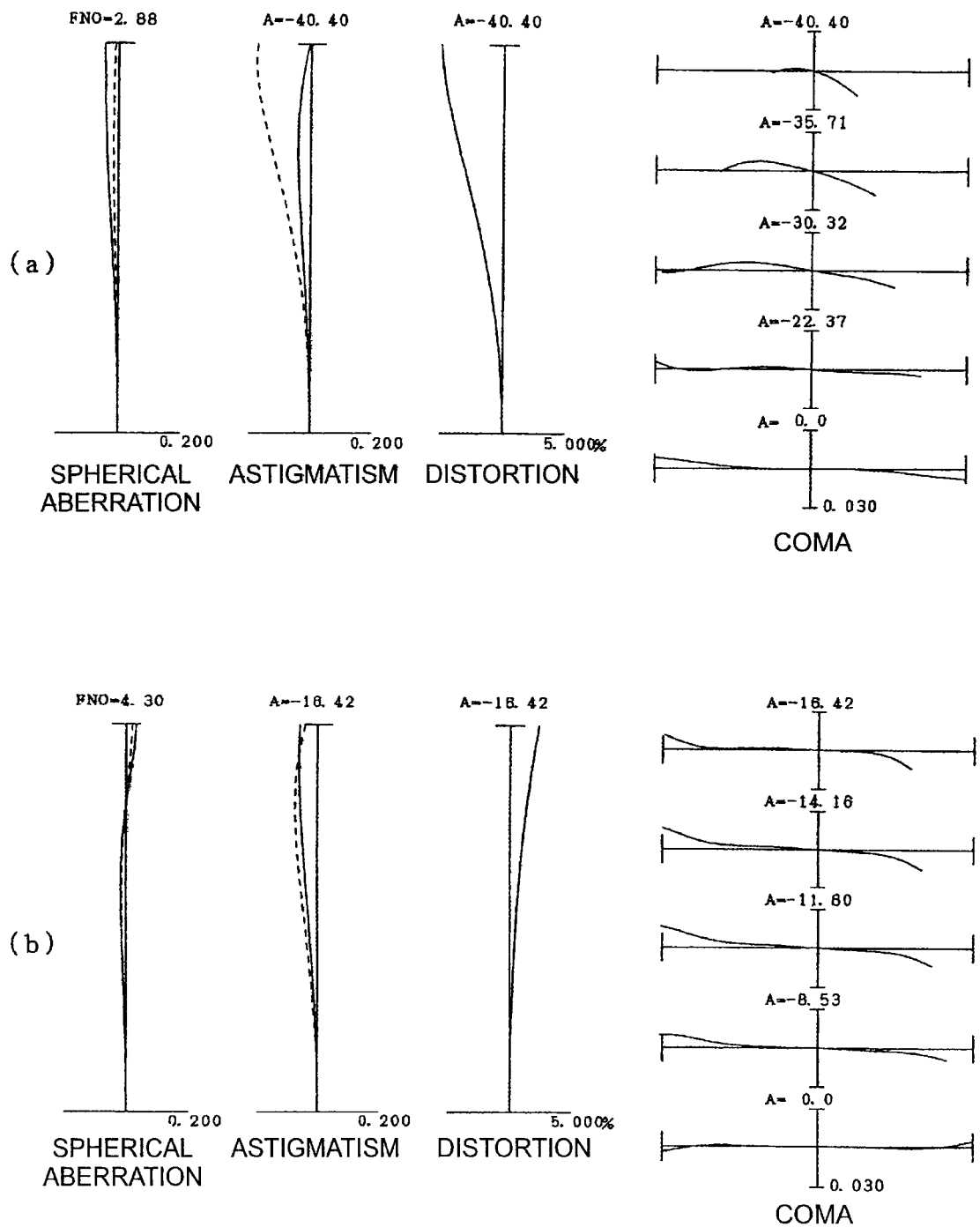
FIG. 15 is an aberration diagram showing aberrations in the infinity in-focus state in the fifth embodiment, wherein (a) is an aberration diagram of aberrations in the wide-angle end state and (b) is an aberration diagram of aberrations in an intermediate focal length state 1.
Figure 16:
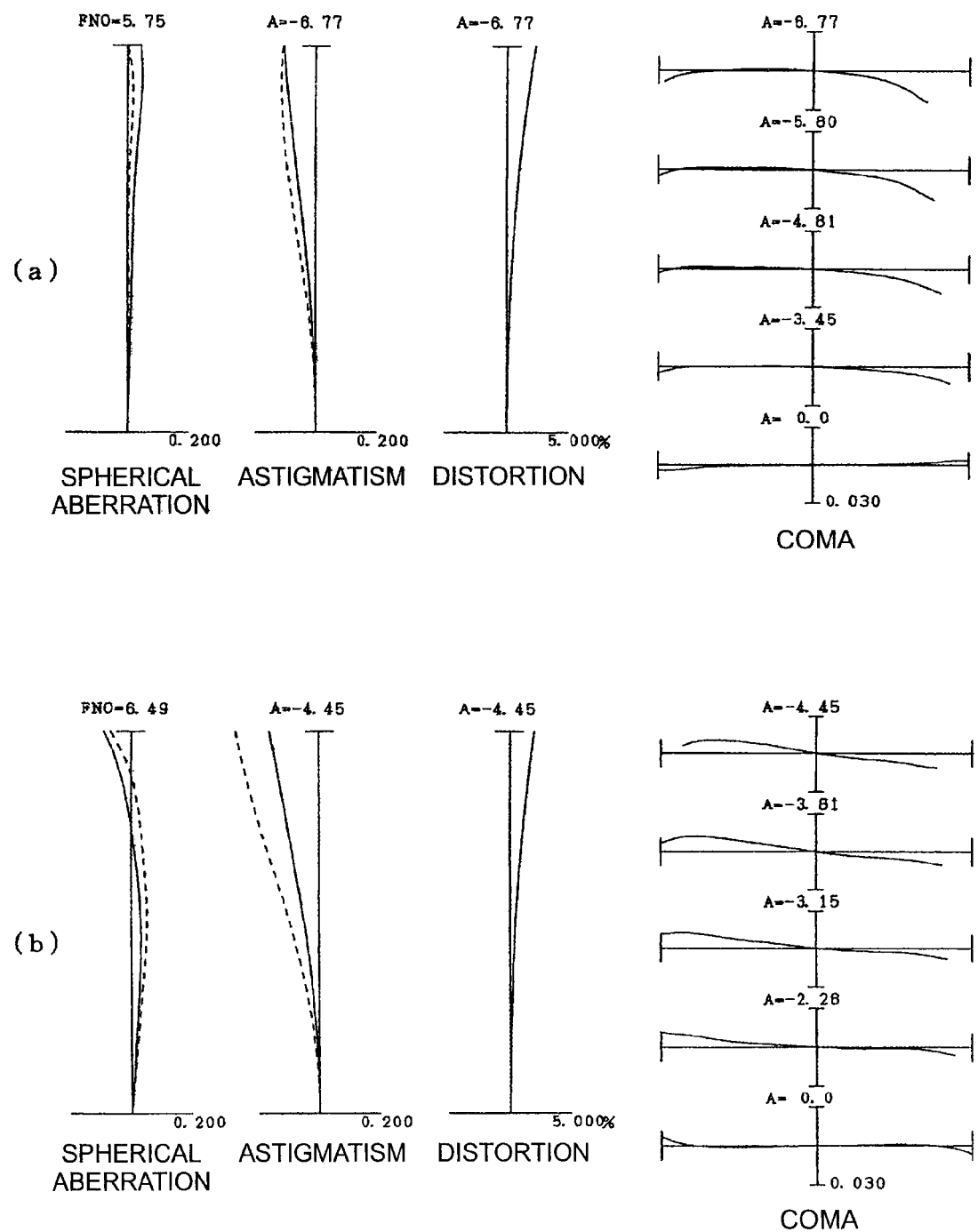
FIG. 16 is an aberration diagram showing aberrations in the infinity in-focus state in the fifth embodiment, wherein (a) is an aberration diagram of aberrations in an intermediate focal length state 2 and (b) is an aberration diagram of aberrations in the telephoto end state.

FIGS. 15 and 16 are aberration diagrams of aberrations in the fifth embodiment for the d line (λ=587.6 nm). Specifically, FIG. 15(a) is an aberration diagram of aberrations in the infinity in-focus state in the wide-angle end state (f=10.51 mm), FIG. 15(b) an aberration diagram of aberrations in the infinity in-focus state in the intermediate focal length state 1 (f=28.19 mm), FIG. 16(a) an aberration diagram of aberrations in the infinity in-focus state in the intermediate focal length state 2 (f=70.00 mm), and FIG. 16(b) an aberration diagram of aberrations in the infinity in-focus state in the telephoto end state (f=107.09 mm). It is apparent from the aberration diagrams that in the fifth embodiment the optical system is corrected well for the aberrations in each of the focal length states ranging from the wide-angle end state to the telephoto end state, and has excellent imaging performance.

Sixth Embodiment

Figure 17:
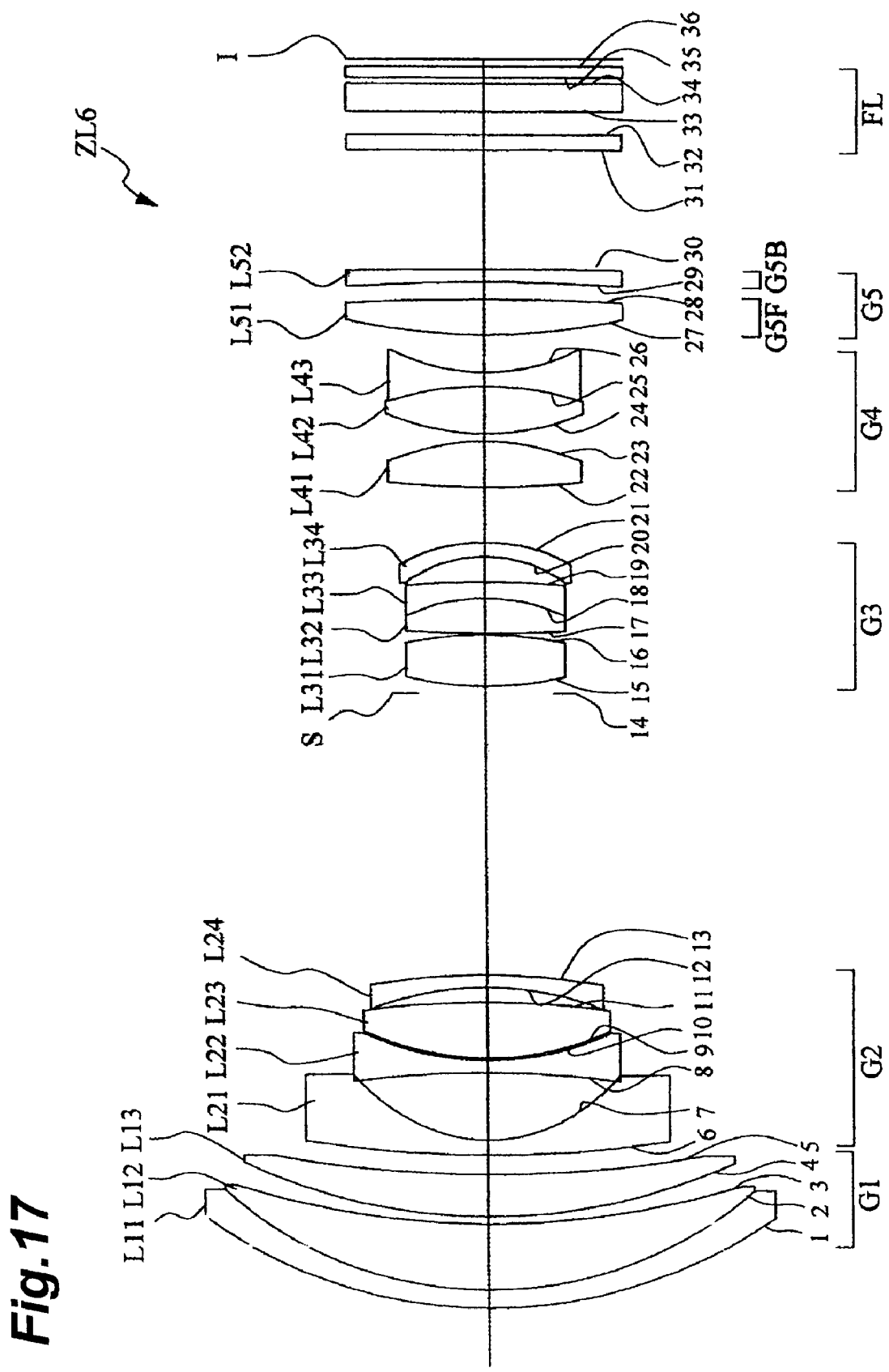
FIG. 17 is a sectional view showing a configuration of a zoom lens according to a sixth embodiment.

FIG. 17 is a drawing showing a configuration of a zoom lens ZL6 according to the sixth embodiment of the present invention. In this zoom lens ZL6 of FIG. 17, the first lens group G1 is composed of a cemented positive lens consisting of a negative meniscus lens L11 with a convex surface on the object side and a positive meniscus lens L12 with a convex surface on the object side cemented together, and a positive meniscus lens L13 with a convex surface on the object side, which are arranged in the order from the object side. The second lens group G2 is composed of a negative meniscus lens L21 with an aspherical surface on the image side and a convex surface on the object side, a biconcave lens L22, a biconvex lens L23, and a negative meniscus lens L24 with a convex surface on the image side, which are arranged in the order from the object side. The third lens group G3 is composed of a biconvex lens L31, a cemented negative lens consisting of a biconvex lens L32 and a negative meniscus lens L33 with a concave surface on the object side cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43 cemented together, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a biconcave lens L52. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 21 below presents values of specifications of this sixth embodiment. In table 21 below, W presents wide-angle end state, IFL1 intermediate focal length state 1, IFL2 intermediate focal length state 2, and T telephoto end state. Furthermore, in table 21 below, s presents Surface number, r Radius of curvature, d Surface separation, n Refractive index, and ν Abbe number.

TABLE 21

| | W | | IFL1 | | IFL2 | | T |
|---|---|---|---|---|---|---|---|
| f = | 9.05 | ~ | 22.52 | ~ | 35.80 | ~ | 42.62 |
| F. NO = | 2.76 | ~ | 3.95 | ~ | 4.89 | ~ | 5.39 |

TABLE 21-continued

| 2ω = | 90.25 | ~ | 41.28 | ~ | 26.62 | ~ | 22.46 |
|---|---|---|---|---|---|---|---|
| total length = | 94.09 | ~ | 93.83 | ~ | 106.96 | ~ | 113.00 |
| image height = | 8.50 | ~ | 8.50 | ~ | 8.50 | ~ | 8.50 |

| s | r | d | n | ν | |
|---|---|---|---|---|---|
| 1 | 31.9730 | 1.20 | 1.92286 | 20.88 | |
| 2 | 26.0238 | 4.39 | 1.48749 | 70.23 | |
| 3 | 54.6598 | 0.50 | | | |
| 4 | 37.7662 | 2.81 | 1.61772 | 49.82 | |
| 5 | 79.8887 | (d5) | | | |
| 6 | 76.4522 | 1.00 | 1.80139 | 45.45 | |
| *7 | 9.6752 | 4.50 | | | |
| 8 | −65.4551 | 0.85 | 1.77250 | 49.60 | |
| 9 | 18.6040 | 0.15 | | | |
| 10 | 18.3739 | 3.78 | 1.80810 | 22.76 | |
| 11 | −57.0540 | 1.00 | | | |
| 12 | −20.4219 | 0.85 | 1.75500 | 52.32 | |
| 13 | −42.0538 | (d13) | | | |
| 14 | 0.0000 | 0.50 | | | (aperture stop S) |
| 15 | 21.3394 | 3.50 | 1.61881 | 63.85 | |
| 16 | −24.7537 | 0.10 | | | |
| 17 | 96.0666 | 2.39 | 1.49700 | 81.54 | |
| 18 | −11.5845 | 1.11 | 1.88300 | 40.76 | |
| 19 | −61.3052 | 1.75 | | | |
| 20 | −8.3161 | 0.95 | 1.80139 | 45.45 | |
| *21 | −11.9704 | (d21) | | | |
| 22 | 63.4775 | 3.09 | 1.61881 | 63.85 | |
| *23 | −13.1070 | 0.50 | | | |
| 24 | 15.7383 | 3.21 | 1.60300 | 65.44 | |
| 25 | −19.8255 | 0.95 | 1.77250 | 49.60 | |
| 26 | 13.0577 | (d26) | | | |
| 27 | 39.4764 | 2.37 | 1.49700 | 81.54 | |
| 28 | −185.9870 | 1.17 | | | |
| 29 | −135.3638 | 0.85 | 1.74320 | 49.34 | |
| 30 | −500.0000 | (d30) | | | |
| 31 | 0.0000 | 1.00 | 1.51680 | 64.12 | |
| 32 | 0.0000 | 1.50 | | | |
| 33 | 0.0000 | 1.87 | 1.51680 | 64.12 | |
| 34 | 0.0000 | 0.40 | | | |
| 35 | 0.0000 | 0.70 | 1.51680 | 64.12 | |
| 36 | 0.0000 | (Bf) | | | |

In this sixth embodiment, each lens surface of the seventh surface, the twenty first surface, and the twenty third surface is formed in an aspherical shape. Table 22 below provides data of the aspherical surfaces, i.e., values of the radius R of curvature at the top, the conic constant κ, and the aspheric constants A4-A10.

TABLE 22

| R | κ | A4 | A6 | A8 | A10 |
|---|---|---|---|---|---|
| | | [7th surface] | | | |
| 9.6752 | −1.5364 | +2.7625E−4 | −1.5905E−6 | +1.2444E−8 | −4.9169E−11 |
| | | [21st surface] | | | |
| −11.9704 | +0.2366 | −1.8454E−4 | −1.7457E−6 | +1.0063E−8 | −2.9003E−10 |
| | | [23rd surface] | | | |
| −13.1070 | +2.3774 | +2.2614E−4 | +1.4935E−6 | −8.3472E−9 | +3.0158E−10 |

In this sixth embodiment, the following spaces vary during carrying out zooming: the axial air space d5 between the first lens group G1 and the second lens group G2; the axial air space d13 between the second lens group G2 and the third lens group G3; the axial air space d21 between the third lens group G3 and the fourth lens group G4; the axial air space d26 between the fourth lens group G4 and the fifth lens group G5; the axial air space d30 between the fifth lens group G5 and the filter group FL; and the back focus Bf. Table 23 below presents variable spaces at each of focal lengths in the wide-angle end state, intermediate focal length state 1, intermediate focal length state 2, and the telephoto end state. In table 23 below, W presents wide-angle end state, IFL1 intermediate focal length state 1, IFL2 intermediate focal length state 2, and T telephoto end state.

TABLE 23

| | W | IFL1 | IFL2 | T |
|---|---|---|---|---|
| f | 9.0500 | 22.5194 | 35.8000 | 42.6200 |
| d5 | 1.3000 | 10.9538 | 17.0431 | 18.4328 |
| d13 | 19.2299 | 6.3860 | 2.9793 | 1.8692 |
| d21 | 3.7818 | 1.9156 | 1.3026 | 1.1078 |
| d26 | 2.5000 | 17.2955 | 28.3630 | 34.3155 |
| d30 | 7.8300 | 7.8300 | 7.8300 | 7.8300 |
| Bf | 0.5000 | 0.4999 | 0.4999 | 0.4999 |

Table 24 below presents values corresponding to the respective condition expressions in the sixth embodiment of the present invention.

TABLE 24 fw = 9.0500
f1 = 80.6392
f2 = −11.0147
f3 = 49.7508
f4 = 23.0811
f5 = 88.1144
f5R = 65.7520
(1)f5/fw = 9.7364
(2)|f5R|/f5 = 0.7462

Figure 18:
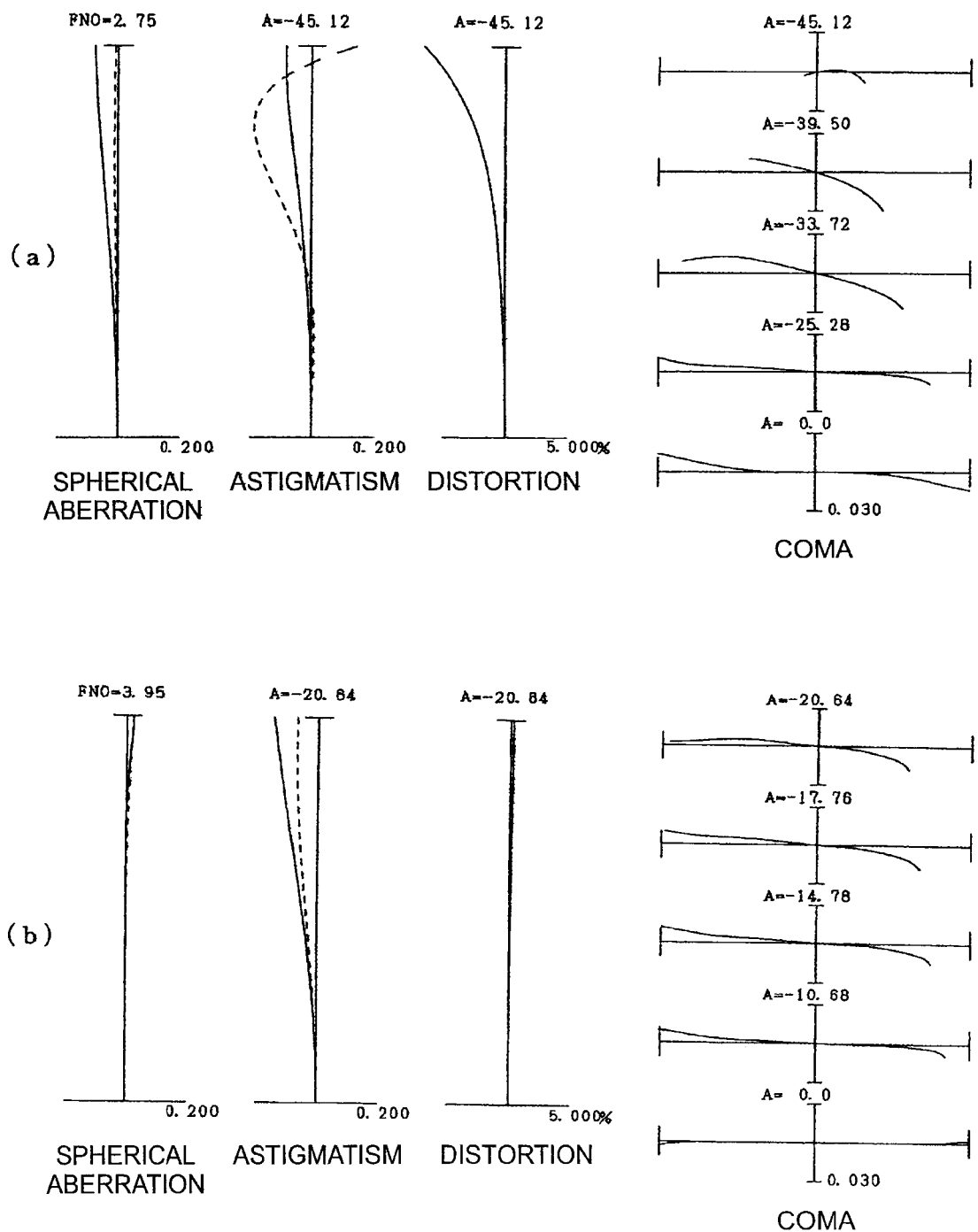
FIG. 18 is an aberration diagram showing aberrations in the infinity in-focus state in the sixth embodiment, wherein (a) is an aberration diagram of aberrations in the wide-angle end state and (b) is an aberration diagram of aberrations in an intermediate focal length state 1.

FIGS. 18 and 19 are aberration diagrams of aberrations in the sixth embodiment for the d line (λ=587.6 nm). Specifically, FIG. 18(*a*) is an aberration diagram of aberrations in the infinity in-focus state in the wide-angle end state (f=9.05 mm), FIG. 18(*b*) an aberration diagram of aberrations in the infinity in-focus state in the intermediate focal length state 1 (f=22.52 mm), FIG. 19(*a*) an aberration diagram of aberrations in the infinity in-focus state in the intermediate focal length state 2 (f=35.80 mm), and FIG. 19(*b*) an aberration diagram of aberrations in the infinity in-focus state in the telephoto end state (f=42.62 mm). It is apparent from the aberration diagrams that in the sixth embodiment the optical system is corrected well for the aberrations in each of the focal length states ranging from the wide-angle end state to the telephoto end state, and has excellent imaging performance.

Seventh Embodiment

Figure 20:
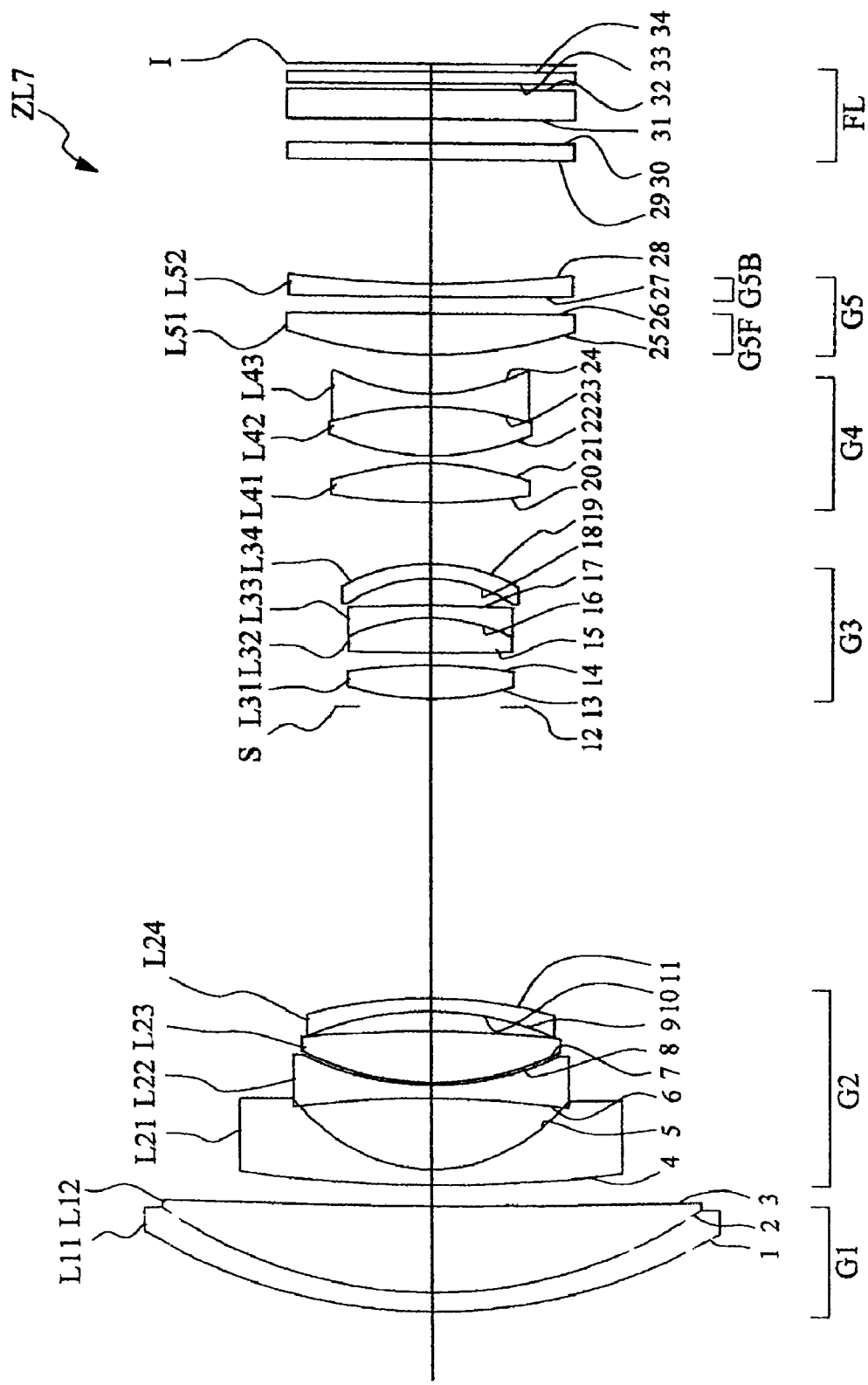
FIG. 20 is a sectional view showing a configuration of a zoom lens according to a seventh embodiment.

FIG. 20 is a drawing showing a configuration of a zoom lens ZL7 according to the seventh embodiment of the present invention. In this zoom lens ZL7 of FIG. 20, the first lens group G1 is composed of a cemented positive lens consisting of a negative meniscus lens L11 with a convex surface on the object side and a positive meniscus lens L12 with a convex surface on the object side cemented together, which are arranged in the order from the object side. The second lens group G2 is composed of a negative meniscus lens L21 with an aspherical surface on the image side and a convex surface on the object side, a biconcave lens L22, a biconvex lens L23, and a negative meniscus lens L24 with a convex surface on the image side, which are arranged in the order from the object side. The third lens group G3 is composed of a biconvex lens L31, a cemented negative lens consisting of a biconvex lens L32 and a negative meniscus lens L33 with a concave surface on the object side cemented together, and a negative meniscus lens L34 with an aspherical surface on the image side and a concave surface on the object side, which are arranged in the order from the object side. The fourth lens group G4 is composed of a biconvex lens L41 with a surface of an aspherical shape on the image side, and a cemented negative lens consisting of a biconvex lens L42 and a biconcave lens L43 cemented together, which are arranged in the order from the object side. The fifth lens group G5 is composed of a front lens group G5F and a rear lens group G5B arranged in the order from the object side, the front lens group G5F is composed of a biconvex lens L51, and the rear lens group G5B is composed of a negative meniscus lens L52 with a convex surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state.

Table 25 below presents values of specifications of the seventh embodiment of the present invention. In table 25 below, W presents wide-angle end state, IFL1 intermediate focal length state 1, IFL2 intermediate focal length state 2, and T telephoto end state. Furthermore, in table 25 below, s presents Surface number, r Radius of curvature, d Surface separation, n Refractive index, and ν Abbe number.

TABLE 25

|  | W | IFL1 | IFL2 | T |
|---|---|---|---|---|
| f = | 9.05 ~ | 22.40 ~ | 34.00 ~ | 42.62 |
| F. NO = | 2.83 ~ | 4.08 ~ | 4.96 ~ | 5.64 |
| 2ω = | 89.76 ~ | 41.20 ~ | 27.78 ~ | 22.36 |
| total length = | 79.93 ~ | 91.96 ~ | 104.64 ~ | 113.00 |
| image height = | 8.50 ~ | 8.50 ~ | 8.50 ~ | 8.50 |

| s | r | d | n | ν |
|---|---|---|---|---|
| 1 | 34.4533 | 1.20 | 1.92286 | 20.88 |
| 2 | 29.0069 | 5.50 | 1.48749 | 70.23 |
| 3 | 489.4798 | (d3) | | |
| 4 | 89.0331 | 1.00 | 1.80139 | 45.45 |
| *5 | 9.6169 | 4.50 | | |

TABLE 25-continued

| 6 | −67.8578 | 0.85 | 1.77250 | 49.60 | |
|---|---|---|---|---|---|
| 7 | 18.0501 | 0.16 | | | |
| 8 | 17.4015 | 3.26 | 1.80810 | 22.76 | |
| 9 | −81.8064 | 1.32 | | | |
| 10 | −18.6515 | 0.85 | 1.75500 | 52.32 | |
| 11 | −27.9049 | (d11) | | | |
| 12 | 0.0000 | 0.50 | | | (aperture stop S) |
| 13 | 17.4110 | 2.20 | 1.61800 | 63.33 | |
| 14 | −31.1768 | 0.81 | | | |
| 15 | 192.8475 | 2.25 | 1.49700 | 81.54 | |
| 16 | −11.1665 | 0.80 | 1.88300 | 40.76 | |
| 17 | −92.2409 | 1.75 | | | |
| 18 | −8.9137 | 0.94 | 1.80139 | 45.45 | |
| *19 | −11.8427 | (d19) | | | |
| 20 | 39.0489 | 2.55 | 1.61881 | 63.85 | |
| *21 | −14.9553 | 0.50 | | | |
| 22 | 15.4273 | 3.12 | 1.60300 | 65.44 | |
| 23 | −20.0198 | 0.83 | 1.77250 | 49.60 | |
| 24 | 12.7347 | (d24) | | | |
| 25 | 27.0600 | 2.64 | 1.49700 | 81.54 | |
| 26 | 3898.5057 | 1.05 | | | |
| 27 | 572.0621 | 0.85 | 1.74320 | 49.34 | |
| 28 | 65.7330 | (d28) | | | |
| 29 | 0.0000 | 1.00 | 1.51680 | 64.12 | |
| 30 | 0.0000 | 1.50 | | | |
| 31 | 0.0000 | 1.87 | 1.51680 | 64.12 | |
| 32 | 0.0000 | 0.40 | | | |
| 33 | 0.0000 | 0.70 | 1.51680 | 64.12 | |
| 34 | 0.0000 | (Bf) | | | |

In this seventh embodiment, each lens surface of the fifth surface, the nineteenth surface, and the twenty first surface is formed in an aspherical shape. Table 26 below provides data of the aspherical surfaces, i.e., values of the radius R of curvature at the top, the conic constant κ, and the aspheric constants A4-A10.

TABLE 26

| R | κ | A4 | A6 | A8 | A10 |
|---|---|---|---|---|---|
| [5th surface] | | | | | |
| 9.6169 | −0.2320 | +1.0761E−4 | +1.7701E−7 | −8.8827E−10 | +2.5485E−11 |
| [19th surface] | | | | | |
| −11.8427 | +0.0937 | −1.7276E−4 | −1.3855E−6 | −5.9996E−10 | −1.0375E−10 |
| [21st surface] | | | | | |
| −14.9553 | +2.4717 | +1.9998E−4 | +7.3189E−7 | −7.8792E−10 | +6.2713E−11 |

In this seventh embodiment, the following spaces vary during carrying out zooming: the axial air space d3 between the first lens group G1 and the second lens group G2; the axial air space d11 between the second lens group G2 and the third lens group G3; the axial air space d19 between the third lens group G3 and the fourth lens group G4; the axial air space d24 between the fourth lens group G4 and the fifth lens group G5; the axial air space d28 between the fifth lens group G5 and the filter group FL; and the back focus Bf. Table 27 below presents variable spaces at each of focal lengths in the wide-angle end state, intermediate focal length state 1, intermediate focal length state 2, and the telephoto end state. In table 27 below, W presents wide-angle end state, IFL1 intermediate focal length state 1, IFL2 intermediate focal length state 2, and T telephoto end state.

TABLE 27

|     | W       | IFL1    | IFL2    | T       |
|-----|---------|---------|---------|---------|
| f   | 9.0500  | 22.4000 | 34.0000 | 42.6200 |
| d3  | 1.3000  | 12.3036 | 18.6313 | 20.8845 |
| d11 | 18.9195 | 6.1037  | 2.9808  | 1.5530  |
| d19 | 3.9807  | 2.4112  | 1.9273  | 1.6912  |
| d24 | 2.5000  | 17.6487 | 27.8723 | 35.6432 |
| d28 | 7.8300  | 7.8300  | 7.8300  | 7.8300  |
| Bf  | 0.5000  | 0.4999  | 0.4999  | 0.4999  |

Table 28 below presents values corresponding to the respective condition expressions in the seventh embodiment of the present invention.

TABLE 28 fw = 9.0500
f1 = 90.1507
f2 = −11.3815
f3 = 48.7083
f4 = 23.4057
f5 = 112.8924
f5R = 54.8150
(1)f5/fw = 12.4743
(2)|f5R|/f5 = 0.4856

Figure 21:
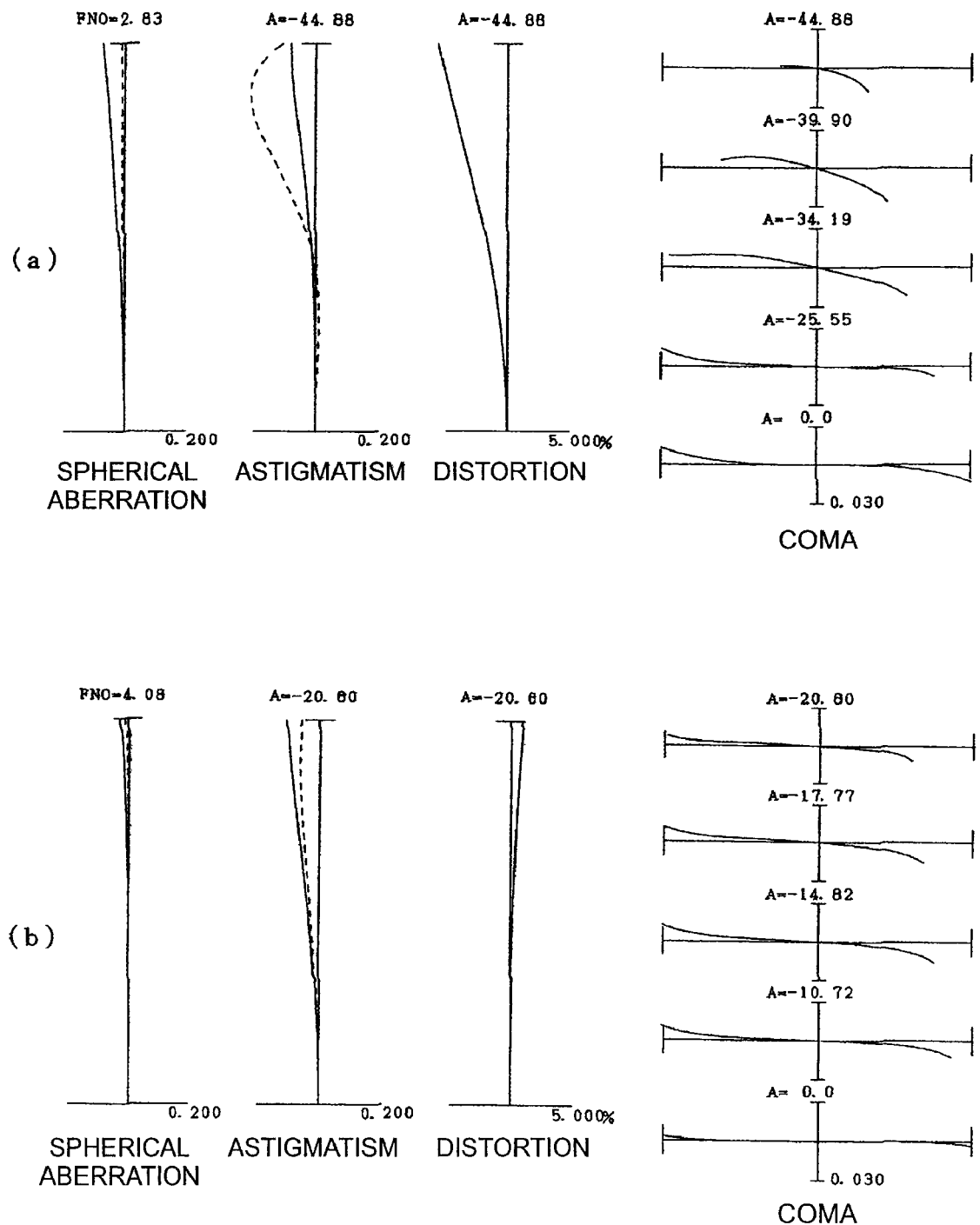
FIG. 21 is an aberration diagram showing aberrations in the infinity in-focus state in the seventh embodiment, wherein (a) is an aberration diagram of aberrations in the wide-angle end state and (b) is an aberration diagram of aberrations in an intermediate focal length state 1.

FIGS. 21 and 22 are aberration diagrams of aberrations in the seventh embodiment for the d line (λ=587.6 nm). Specifically, FIG. 21(a) is an aberration diagram of aberrations in the infinity in-focus state in the wide-angle end state (f=9.05 mm), FIG. 21(b) an aberration diagram of aberrations in the infinity in-focus state in the intermediate focal length state 1 (f=22.40 mm), FIG. 22(a) an aberration diagram of aberrations in the infinity in-focus state in the intermediate focal length state 2 (f=34.00 mm), and FIG. 22(b) an aberration diagram of aberrations in the infinity in-focus state in the telephoto end state (f=42.62 mm). It is apparent from the aberration diagrams that in the seventh embodiment the optical system is corrected well for the aberrations in each of the focal length states ranging from the wide-angle end state to the telephoto end state, and has excellent imaging performance.

Eighth Embodiment

Figure 23:
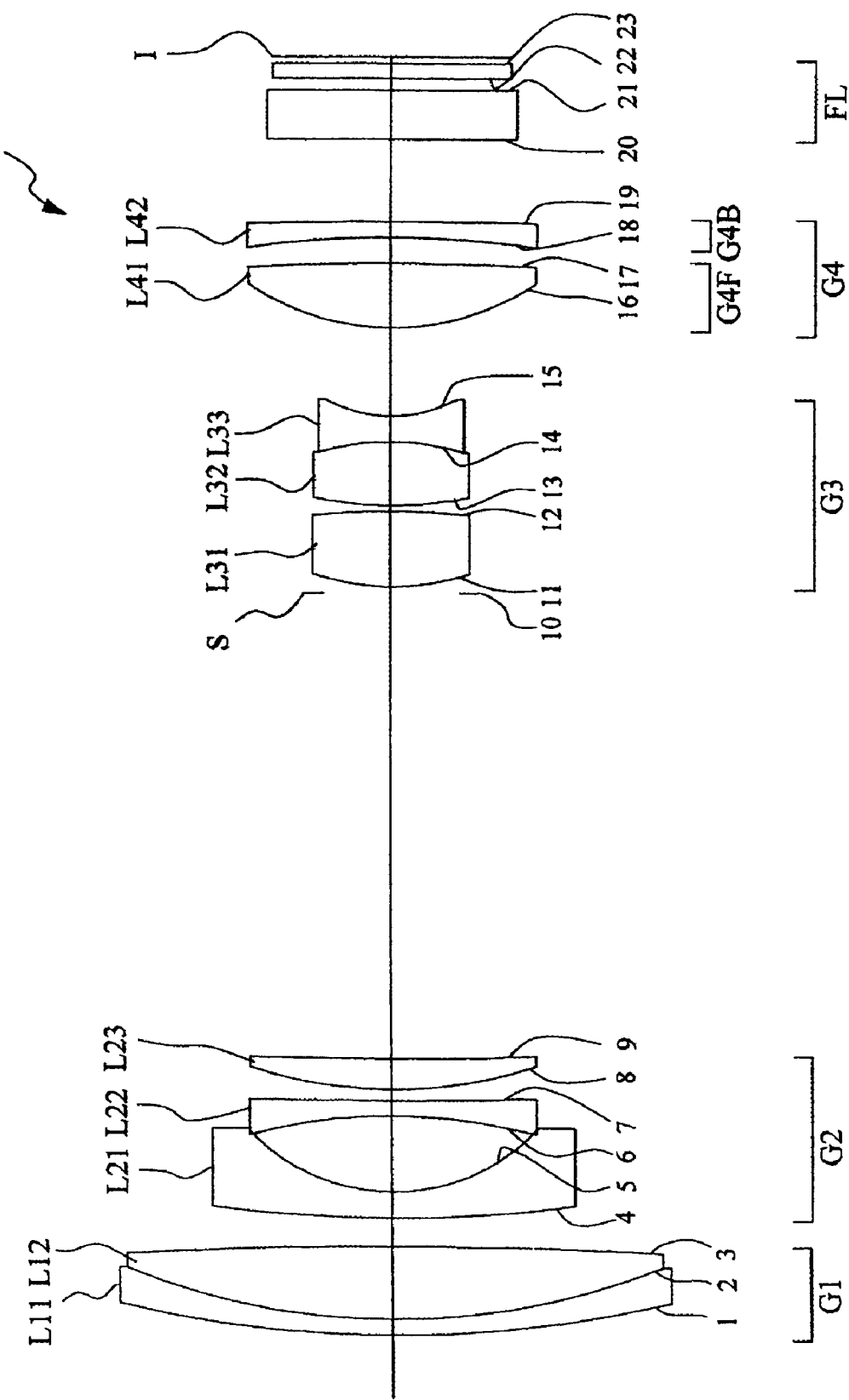
FIG. 23 is a sectional view showing a configuration of a zoom lens according to an eighth embodiment.

FIG. 23 is a drawing showing a configuration of a zoom lens ZL8 according to the eighth embodiment of the present invention. The first to seventh embodiments described above showed the configurations wherein the zoom lens ZL was composed of five groups, whereas the eighth embodiment shows the configuration wherein the zoom lens is composed of four groups. In the zoom lens ZL8 of FIG. 23, the first lens group G1 is composed of a cemented positive lens consisting of a negative meniscus lens L11 with a convex surface on the object side and a biconvex lens L12 cemented together, which are arranged in the order from the object side. The second lens group G2 is composed of a negative meniscus lens L21 with an aspherical surface on the image side and a convex surface on the object side, a biconcave lens L22, and a positive meniscus lens L23 with a convex surface on the object side, which are arranged in the order from the object side. The third lens group G3 is composed of a biconvex lens L31 with an aspherical surface on the object side, and a cemented negative lens consisting of a biconvex lens L32 and a biconcave lens L33, which are arranged in the order from the object side. The fourth lens group G4 is composed of a front lens group G4F and a rear lens group G4B arranged in the order from the object side, the front lens group G4F is composed of a biconvex lens L41, and the rear lens group G4B is composed of a negative meniscus lens L42 with a concave surface on the object side. Furthermore, the filter group FL is composed of a low-pass filter, an infrared cut filter, and so on. The aperture stop S is located in front of the third lens group G3 on the object side and moves together with the third lens group G3 during carrying out zooming from the wide-angle end state to the telephoto end state. In table 29 below, W presents wide-angle end state, IFL intermediate focal length state, and T telephoto end state. Furthermore, in table 29 below, s presents Surface number, r Radius of curvature, d Surface separation, n Refractive index, and ν Abbe number.

TABLE 29

|   | W | | IFL | | T |
|---|---|---|---|---|---|
| f = | 14.54 | ~ | 32.70 | ~ | 68.58 |
| F. NO = | 3.12 | ~ | 4.10 | ~ | 5.56 |
| 2ω = | 63.90 | ~ | 28.88 | ~ | 14.18 |
| total length = | 100.16 | ~ | 110.51 | ~ | 128.98 |
| image height = | 8.50 | ~ | 8.50 | ~ | 8.50 |

| s | r | d | n | ν | |
|---|---|---|---|---|---|
| 1 | 92.2663 | 1.20 | 1.84666 | 23.78 | |
| 2 | 55.3271 | 5.64 | 1.77250 | 49.60 | |
| 3 | −418.6105 | (d3) | | | |
| 4 | 107.4699 | 2.04 | 1.78800 | 47.37 | |
| *5 | 15.0395 | 5.95 | | | |
| 6 | −41.3619 | 1.20 | 1.77250 | 49.60 | |
| 7 | 651.3048 | 0.90 | | | |
| 8 | 34.3775 | 2.43 | 1.84666 | 23.78 | |
| 9 | 450.6154 | (d9) | | | |
| 10 | 0.0000 | 0.50 | | | (aperture stop S) |
| *11 | 17.3186 | 6.00 | 1.61881 | 63.85 | |
| 12 | −54.8653 | 0.45 | | | |
| 13 | 28.0021 | 5.00 | 1.83400 | 37.16 | |
| 14 | −19.3042 | 2.04 | 1.72825 | 28.46 | |
| 15 | 10.2723 | (d15) | | | |
| 16 | 19.3099 | 5.00 | 1.48749 | 70.23 | |
| 17 | −209.9318 | 2.00 | | | |
| 18 | −78.7256 | 1.20 | 1.51633 | 64.14 | |
| 19 | −485.5256 | (d19) | | | |
| 20 | 0.0000 | 3.74 | 1.54437 | 70.51 | |
| 21 | 0.0000 | 0.91 | | | |
| 22 | 0.0000 | 1.13 | 1.51633 | 64.14 | |
| 23 | 0.0000 | (Bf) | | | |

In this eighth embodiment, each lens surface of the fifth surface and the eleventh surface is formed in an aspherical shape. Table 30 below provides data of the aspherical surfaces, i.e., values of the radius R of curvature at the top, the conic constant κ, and the aspheric constants A4-A10.

TABLE 30

| R | κ | A4 | A6 | A8 | A10 |
|---|---|---|---|---|---|
| [5th surface] | | | | | |
| 15.0395 | +1.1787 | −9.04970E−6 | +4.8119E−8 | −3.9862E−10 | +0.0000E−0 |
| [11th surface] | | | | | |
| 17.3186 | +0.4312 | −2.8572E−5 | +3.2384E−9 | −4.5805E−10 | +0.0000E−0 |

In this eighth embodiment, the following spaces vary during carrying out zooming: the axial air space d3 between the first lens group G1 and the second lens group G2; the axial air space d9 between the second lens group G2 and the third lens group G3; the axial air space d15 between the third lens group G3 and the fourth lens group G4; the axial air space d19 between the fourth lens group G4 and the filter group FL; and the back focus Bf. Table 31 below presents variable spaces at each of focal lengths in the wide-angle end state, an intermediate focal length state, and the telephoto end state. In table 31 below, W presents wide-angle end state, IFL intermediate focal length state, and T telephoto end state.

TABLE 31

|     | W       | IFL     | T       |
|-----|---------|---------|---------|
| f   | 14.5358 | 32.6966 | 68.5824 |
| d3  | 2.2148  | 20.6120 | 33.4944 |
| d9  | 36.8963 | 15.7735 | 2.0000  |
| d15 | 6.9301  | 20.0063 | 39.3654 |
| d19 | 6.3000  | 6.3000  | 6.3000  |
| Bf  | 0.5000  | 0.5004  | 0.5000  |

Table 32 below presents values corresponding to the respective condition expressions in the eighth embodiment. In this Table 32, f4F is the focal length of the front lens group G4F forming the fourth lens group G4. Since this eighth embodiment is the 4-group configuration as described above, the lens group closest to the image is the fourth lens group G4 and in accordance therewith, the condition expressions (1) and (2) are replaced using the focal length f4 of this fourth lens group G4 and the focal length f4F of the front lens group G4F.

TABLE 32 fw = 14.5358
f1 = 103.8186
f2 = −25.8630
f3 = 29.2667
f4 = 44.2001
f4F = 36.5354
(1) f4/fw = 3.0408
(2) |f4F|/f4 = 0.8266

Figure 24:
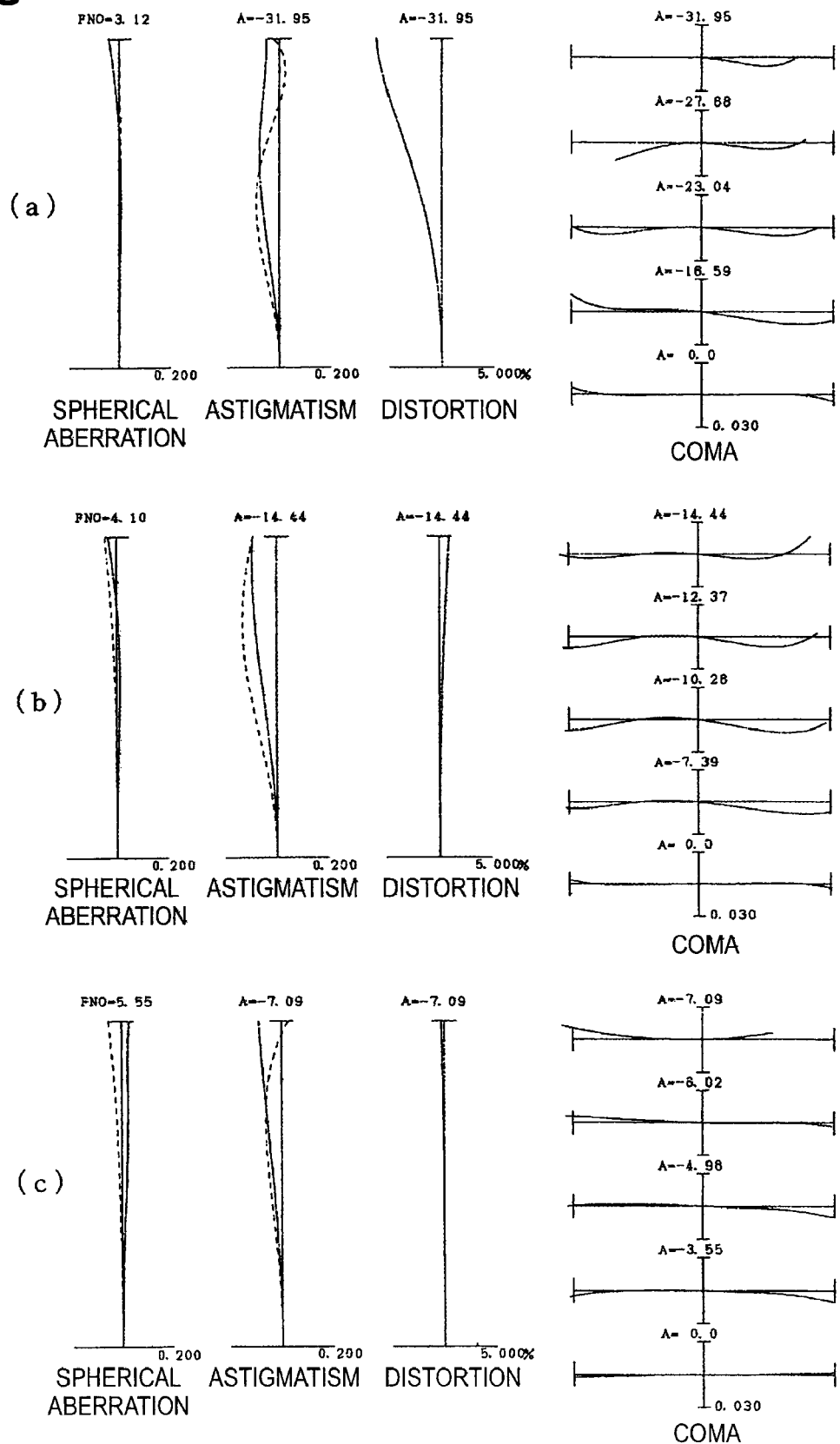
FIG. 24 is an aberration diagram showing aberrations in the infinity in-focus state in the eighth embodiment, wherein (a) is an aberration diagram of aberrations in the wide-angle end state, (b) is an aberration diagram of aberrations in an intermediate focal length state, and (c) is an aberration diagram of aberrations in the telephoto end state.

FIG. 24 is an aberration diagram of aberrations in the eighth embodiment for the d line (λ=587.6 nm). Specifically, FIG. 24(a) is an aberration diagram of aberrations in the infinity in-focus state in the wide-angle end state (f=14.54 mm), FIG. 24(b) an aberration diagram of aberrations in the infinity in-focus state in an intermediate focal length state (f=32.70 mm), and FIG. 24(c) an aberration diagram of aberrations in the infinity in-focus state in the telephoto end state (f=68.58 mm). It is apparent from the aberration diagrams that in the eighth embodiment the optical system is corrected well for the aberrations in each of the focal length states ranging from the wide-angle end state to the telephoto end state, and has excellent imaging performance.

The embodiments of the present invention can be used in an optical apparatus such as a digital still camera and, more particularly, to a zoom lens of a high zoom ratio.

When the zoom lens and the optical apparatus with the zoom lens according to the embodiments are configured as described above, it becomes feasible to realize the zoom lens the optical performance of which is prevented from varying on every occasion of use, as a zoom lens suitable for camcorders, digital still cameras, etc. using solid-state image sensors or the like.

In the optical systems (zoom lenses) of the embodiments, the smallest axial distance from the image-side surface of the lens component closest to the image, to the image plane (the back focus) is preferably in the range of about 10 mm to 30 mm. In the optical systems (zoom lenses) of the embodiments, the image height is preferably in the range of 5 mm to 12.5 mm and more preferably in the range of 5 mm to 9.5 mm.

The above embodiments concern the 4-group configuration and the 5-group configuration, but the above configuration, conditions, etc. are also applicable to other group configurations, e.g., a 6-group configuration. For example, it is also possible to add another lens or lens group closest to the object, or to add another lens or lens group closest to the image. A lens group refers to a portion having at least one lens, which is separated by an air space varying during carrying out zooming. A lens group refers to a portion having at least one lens, which is separated by an air space varying during carrying out zooming.

In the optical systems (zoom lenses) of the embodiments, a single lens group or two or more lens groups, or a partial lens group may be configured to move in the direction of the optical axis, as a focusing lens group which implements focusing from an infinite object to a close object. In this case, the focusing lens group is also applicable to autofocus and is also suitable for motor driving using an ultrasonic motor for autofocus or the like. Particularly, at least a part of the lens group closest to the image is preferably constructed as the focusing lens.

A lens group or a partial lens group may be configured as an antivibration lens group that compensates for image blurring caused by hand shakes, by moving the lens group so as to have a component in the direction perpendicular to the optical axis, or by rotationally moving (or swinging) the lens group around a certain point on the optical axis. Particularly, it is preferable to construct at least a part of the second lens group or at least a part of the third lens group as the antivibration lens group.

A lens surface may be constructed of a spherical surface or a plane, or may be constructed of an aspherical surface. A lens surface of a spherical surface or a plane is preferable because it becomes easier to perform lens processing and assembly adjustment and it prevents degradation of optical performance due to errors in processing and assembly adjustment. In addition, it is preferable because degradation of description performance is less even with deviation of the image plane. When a lens surface is an aspherical surface on the other hand, the aspherical surface may be any one of an aspherical surface made by grinding, a glass mold aspherical surface molded in an aspherical shape of glass with a mold, and a composite aspherical surface made in an aspherical shape of a resin on a surface of glass. A lens surface may be a diffractive surface and a lens may be a gradient index lens (GRIN lens) or a plastic lens.

The aperture stop is preferably located near the third lens group, but a lens frame may be configured to serve as the aperture stop, without provision of any member as an aperture stop.

Each lens surface may be provided with an antireflection film having high transmittance in a wide wavelength range, in order to achieve high-contrast optical performance while reducing flares and ghosts.

The zoom lenses (zooming optical systems) of the embodiments have the zoom ratio of about 4×-12×.

In the zoom lenses (zooming optical systems) of the embodiments, the lens group closest to the image preferably has at least one positive lens component and at least one negative lens component. It is also preferable to arrange the at least one positive lens component and the at least one negative lens component in the order from the object side, with intervention of an air space.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A zoom lens comprising a plurality of lens groups arranged along an optical axis in order from an object side,
   wherein a lens group closest to an image among the plurality of lens groups has a front lens group, and a rear lens group arranged with an air space on an image side of the front lens group,
   wherein the lens group closest to the image is stationary with respect to an image plane, upon zooming from a wide-angle end state to a telephoto end state,
   wherein the front lens group is moved in a direction of the optical axis to adjust focus, and
   wherein in the lens group closest to the image, the front lens group is arranged so as to be closest to the object side.

2. The zoom lens according to claim 1, wherein the rear lens group is stationary with respect to the image plane, upon focusing.

3. The zoom lens according to claim 1, wherein the rear lens group has a negative refracting power.

4. The zoom lens according to claim 1, wherein the front lens group in the lens group closest to the image has a positive lens with a convex surface on the object side.

5. The zoom lens according to claim 1, wherein the rear lens group in the lens group closest to the image has a negative lens with a concave surface on the object side.

6. The zoom lens according to claim 1, wherein the front lens group has a positive refracting power.

7. The zoom lens according to claim 1, wherein upon zooming from the wide-angle end state to the telephoto end state, the rear lens group in the lens group closest to the image is stationary with respect to the image plane.

8. The zoom lens according to claim 1, which satisfies the condition of the following relation:

$$1.25 < fx/fw < 23.2$$

where fw is a focal length of the entire lens system in the wide-angle end state and fx is a focal length of the lens group closest to the image.

9. The zoom lens according to claim 1, which satisfies the condition of the following relation:

$$0.05 < |fxF|/fx < 1.25$$

where fx is a focal length of the lens group closest to the image and fxF is a focal length of the front lens group.

10. The zoom lens according to claim 1, wherein the front lens group in the lens group closest to the image is composed of a single lens.

11. An optical apparatus comprising the zoom lens as set forth in claim 1, which forms an image of an object on a predetermined image plane.

12. A method for forming an image of an object and varying a focal length, comprising the steps of:
   providing a zoom lens that includes a plurality of lens groups arranged along an optical axis in order from an object side, the lens group closest to the image among the plurality of lens groups including a front lens group, and a rear lens group arranged with an air space on an image side of the front lens group;
   varying the focal length of the zoom lens from a wide-angle end state to a telephoto end state with the lens group closest to the image being stationary with respect to an image plane; and
   moving the front lens group in a direction of the optical axis to adjust focus,
   wherein in the lens group closest to the image, the front lens group is arranged so as to be closest to the object side.

13. The method according to claim 12, wherein the rear lens group has a negative refracting power.

14. The method according to claim 12, wherein the rear lens group in the lens group closest to the image has a negative lens with a concave surface on the object side.

15. The method according to claim 12, wherein the front lens group has a positive refracting power.

* * * * *